Nov. 3, 1942.  F. E. D'HUMY ET AL  2,301,024
METHOD OF AND APPARATUS FOR PREPARING FACSIMILE MASTER COPIES
Filed Nov. 1, 1940  7 Sheets-Sheet 1
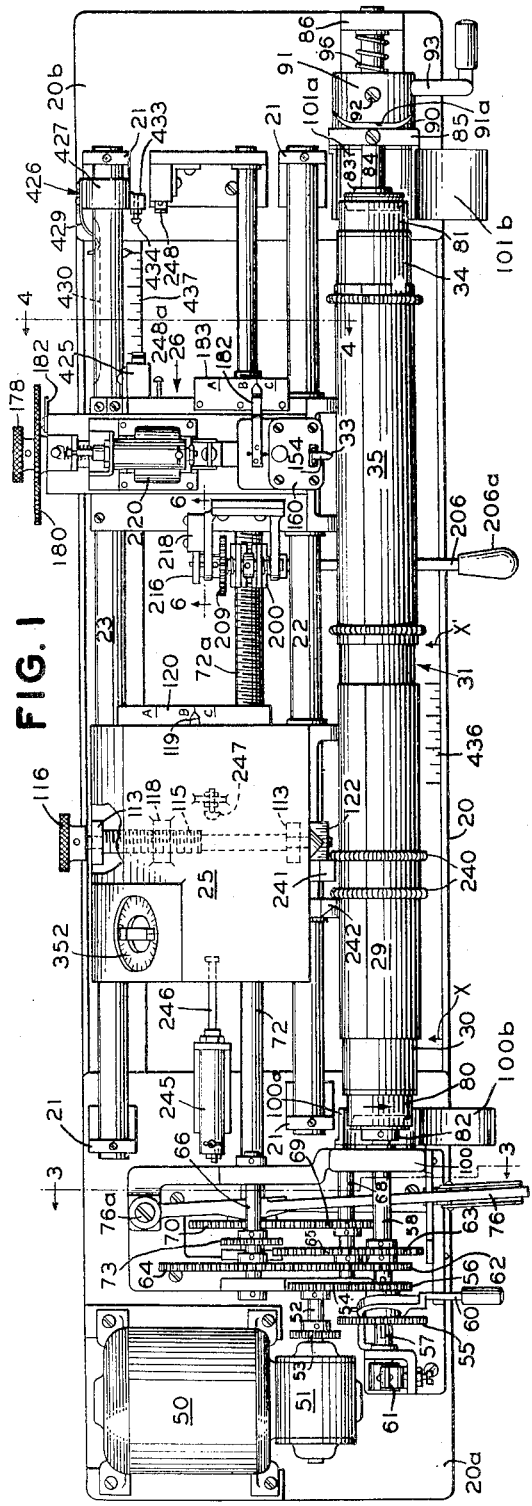
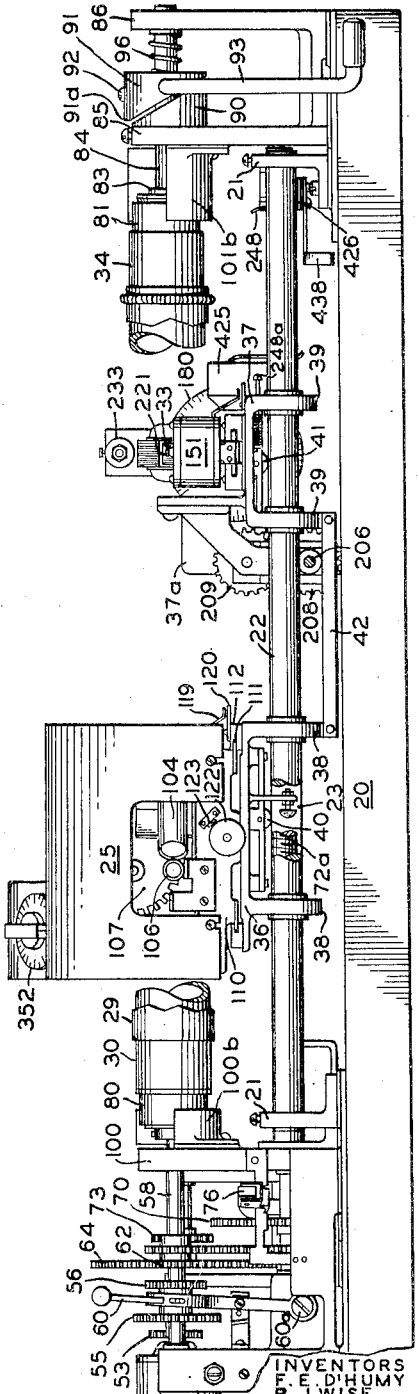
INVENTORS
F. E. D'HUMY
R. J. WISE
R. D. PARROTT
G. H. RIDINGS
F. L. O'BRIEN
BY
ATTORNEY Nov. 3, 1942.     F. E. D'HUMY ET AL     2,301,024
METHOD OF AND APPARATUS FOR PREPARING FACSIMILE MASTER COPIES
Filed Nov. 1, 1940     7 Sheets-Sheet 2

INVENTORS
F. E. D'HUMY
R. J. WISE
R. D. PARROTT
G. H. RIDINGS
F. L. O'BRIEN
BY
ATTORNEY

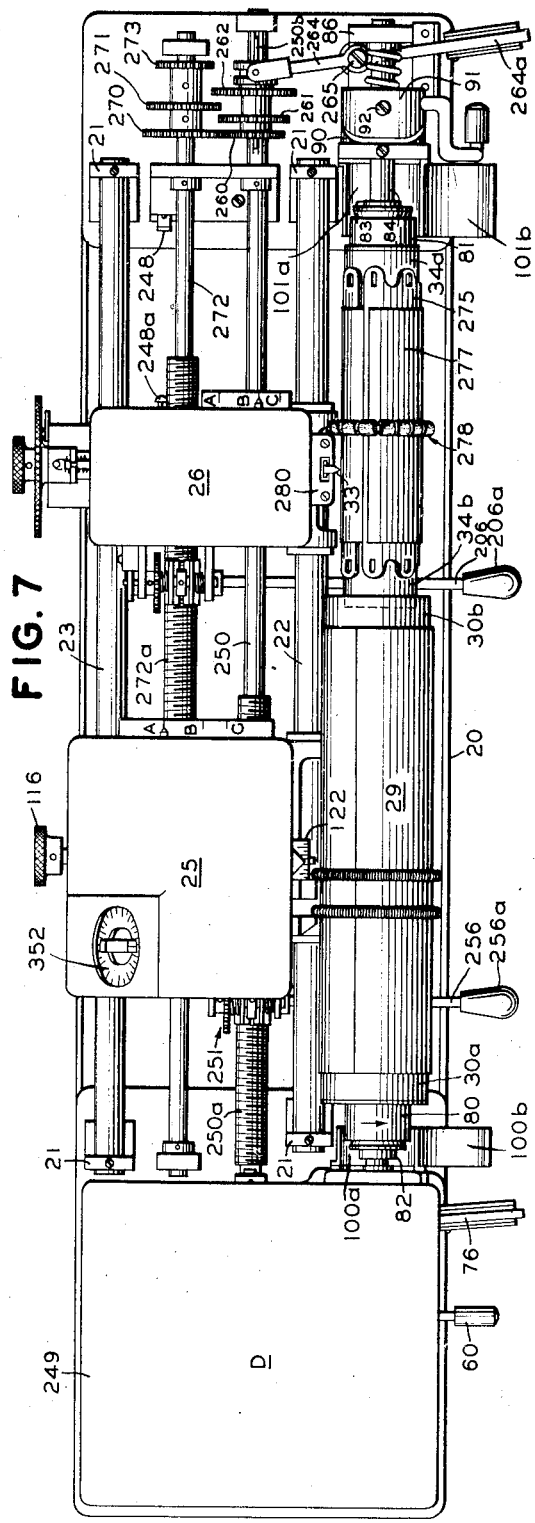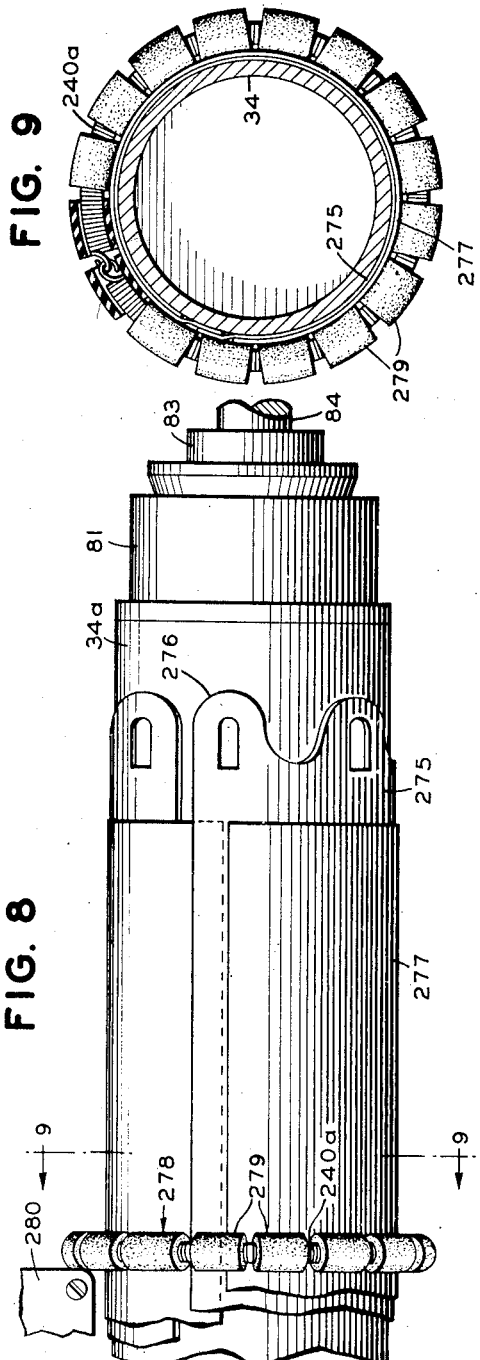

Nov. 3, 1942.  F. E. D'HUMY ET AL  2,301,024
METHOD OF AND APPARATUS FOR PREPARING FACSIMILE MASTER COPIES
Filed Nov. 1, 1940  7 Sheets-Sheet 6
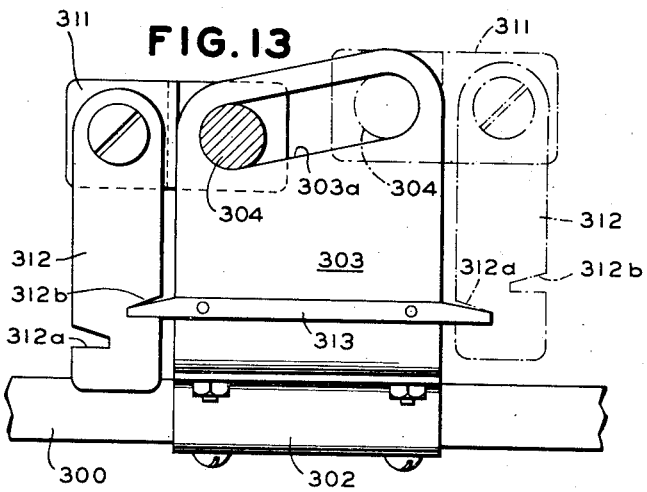
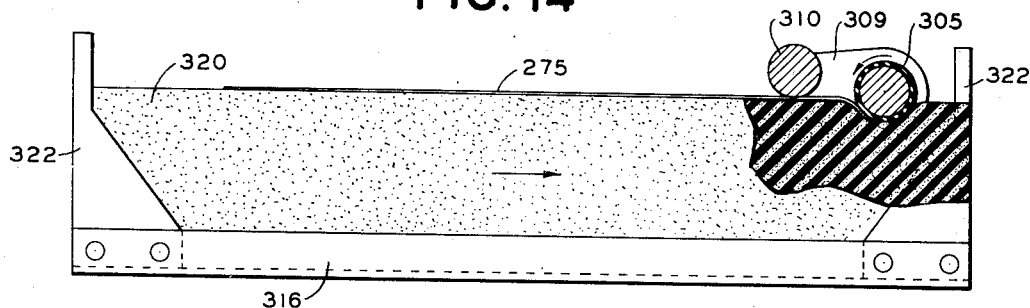
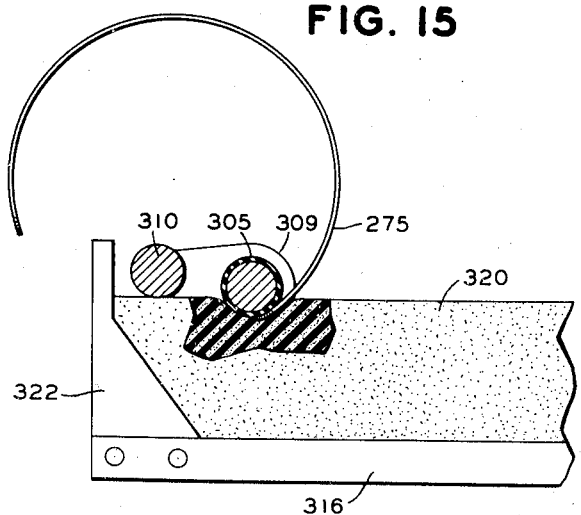
INVENTORS
F. E. D'HUMY
R. J. WISE
R. D. PARROTT
G. H. RIDINGS
F. L. O'BRIEN
BY
ATTORNEY

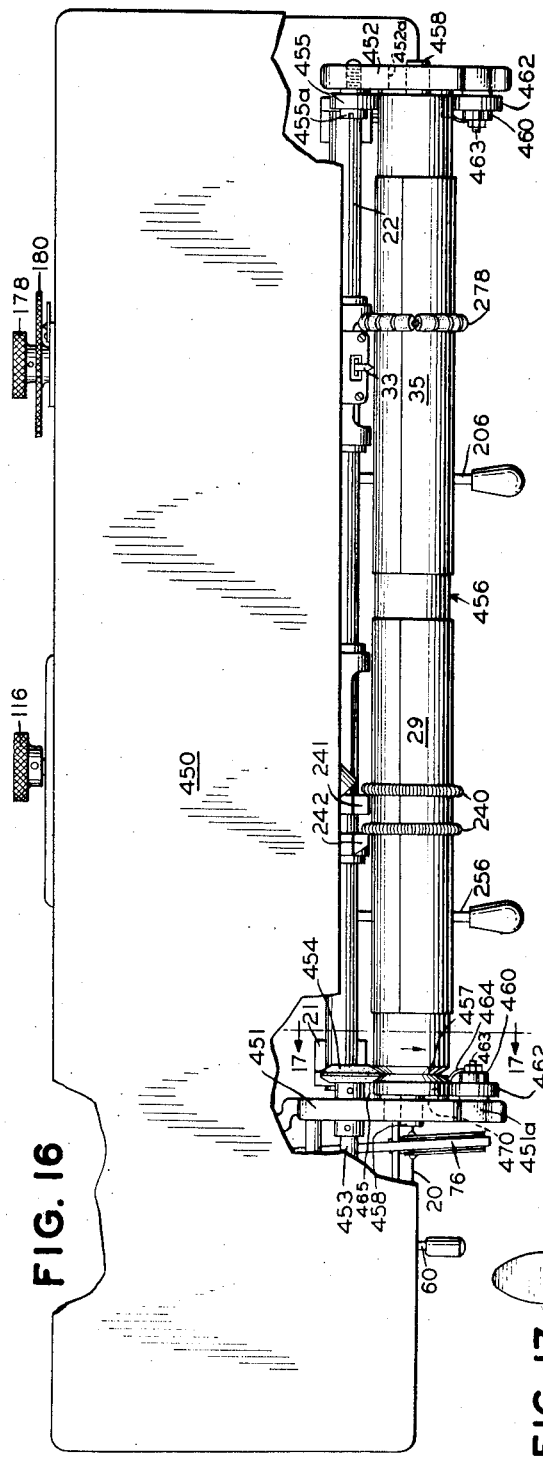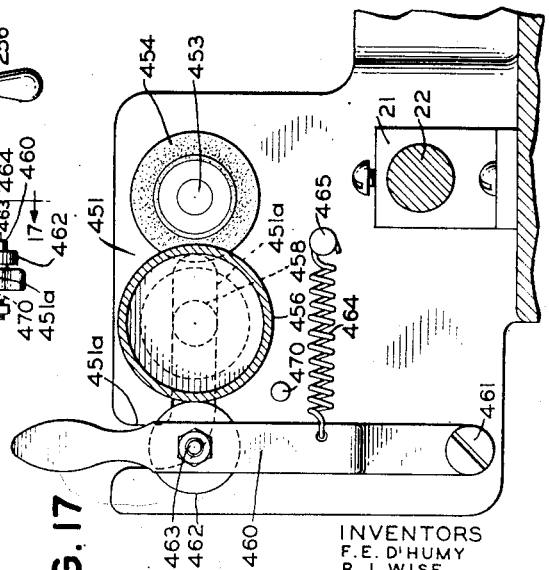

Patented Nov. 3, 1942

2,301,024

UNITED STATES PATENT OFFICE 2,301,024

METHOD OF AND APPARATUS FOR PREPARING FACSIMILE MASTER COPIES

Fernand E. d'Humy, Scarsdale, N. Y., Raleigh J. Wise, Dunellen, Robert D. Parrott, West New York, Garvice H. Ridings, Summit, and Frederic L. O'Brien, Rutherford, N. J., assignors to The Western Union Telegraph Company, New York, N. Y., a corporation of New York Application November 1, 1940, Serial No. 363,928

23 Claims. (Cl. 178—6.6)

This invention relates to improved methods of and apparatus for reproducing facsimile copies, in any desired number, of pictures, drawings, writing and other subject matter, and more particularly to preparing a master copy of an original, from which numerous copies may be made by the Mimeograph, hectograph and other printing processes.

In accordance with the present invention, a picture, message or other subject matter is transmitted from a subject matter sheet or blank and reproduced upon a recording blank which may, if desired, comprise a master blank from which a large number of copies may be made by various known printing and other duplicating processes. The transmitting and recording blanks are carried by interchangeable copy holders, such as rotatable cylinders or drums that are scanned by the combined transmitting and recording apparatus during the reproducing operation, which can readily be placed into operative position in the transmitting and recording apparatus and can readily be removed therefrom.

The blanks on which the original subject matter appears often vary in size, and the subject matter to be scanned may vary considerably in area, and heretofore it has been necessary to utilize transmitting drums of sufficiently large diameter to accommodate the largest size of blank or the largest area of subject matter to be scanned. This has resulted in a considerable loss of time when smaller blanks or smaller areas of subject matter are scanned, since it has required approximately the same time to transmit and record the same as that required for the larger blanks or larger areas of subject matter. Accordingly, one object of the invention is a combined transmitter and recorder in which drums of different diameters may readily be employed to accommodate subject matter blanks of different sizes.

Another object is apparatus of the character disclosed in which the scanning elements of the transmitting and recording apparatus are readily and accurately adjustable with respect to the transmitting and recording drums of copy holders so that copy holders of different sizes may be employed, while maintaining the proper spacing between the transmitter scanning element and the original sheet, and between the recording scanning elements and the facsimile copy, to insure proper transmission and proper reproduction irrespective of the size of the drum or copy holders employed.

A further object of the invention is transmitter-recorder apparatus in which the facsimile copy of an original may be made on the same scale as the original or may be enlarged or reduced with respect to the original without distortion of the subject matter thus reproduced, and in which a facsimile master copy may be made either on a fibrous sheet or on a metal sheet or other suitable reproducing medium.

Still another object is facsimile transmitter-recorder apparatus having means for causing the linear scanning speed of the transmitting and recording drums to be maintained at a constant predetermined value, notwithstanding that drums of different diameters are employed, and means for insuring the proper line feed of the scanning elements for the different sizes of drums.

An additional object is to provide improved circuit arrangements for interconnecting the transmitter and recorder of a unit of the character disclosed.

Still further objects are to provide a more compact and efficient transmitter-recorder unit; to facilitate the insertion, removal and handling of the transmitting and recording drums, and the application of the subject matter blanks thereto and removal therefrom; to provide improved definition of the reproduced subject matter; to enable the use of separate transmitting and recording drums concurrently, which drums may be of the same size or of different sizes, respectively; to enable the subject matter on the original to be reproduced on the recording blank in a manner to provide either a positive or negative copy thereof; and to provide suitable safety means to prevent injury to the subject matter blanks due to accidental contact with the scanning stylus of the recorder.

The foregoing and other objects and advantages of the invention will appear from the following description of the illustrative embodiments of the invention.

Referring to the drawings:

Fig. 1 is a plan view of one embodiment of a transmitter and recorder unit embodying the invention;

Fig. 2 is a front view in elevation of the apparatus of Fig. 1, with certain portions broken away in order more clearly to show other portions thereof;

Figure 19:
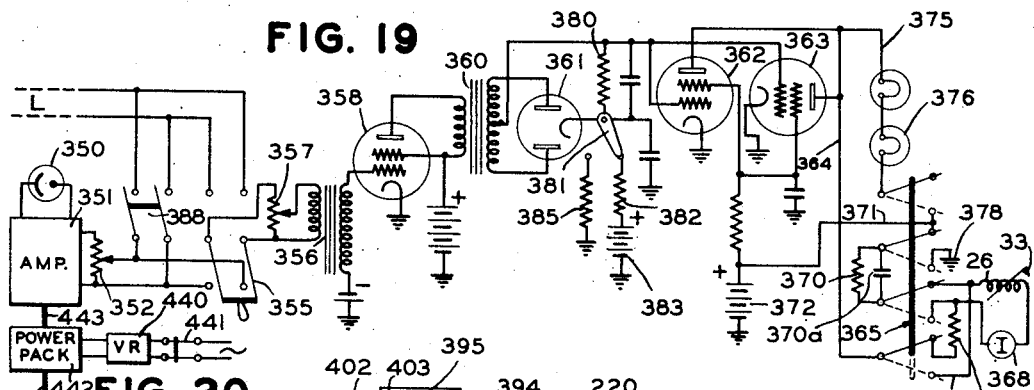
Figure 20:
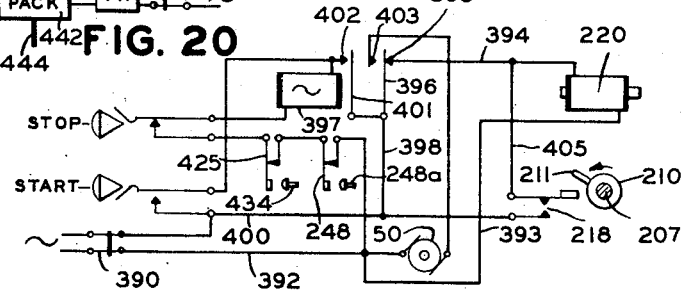
Figure 4:
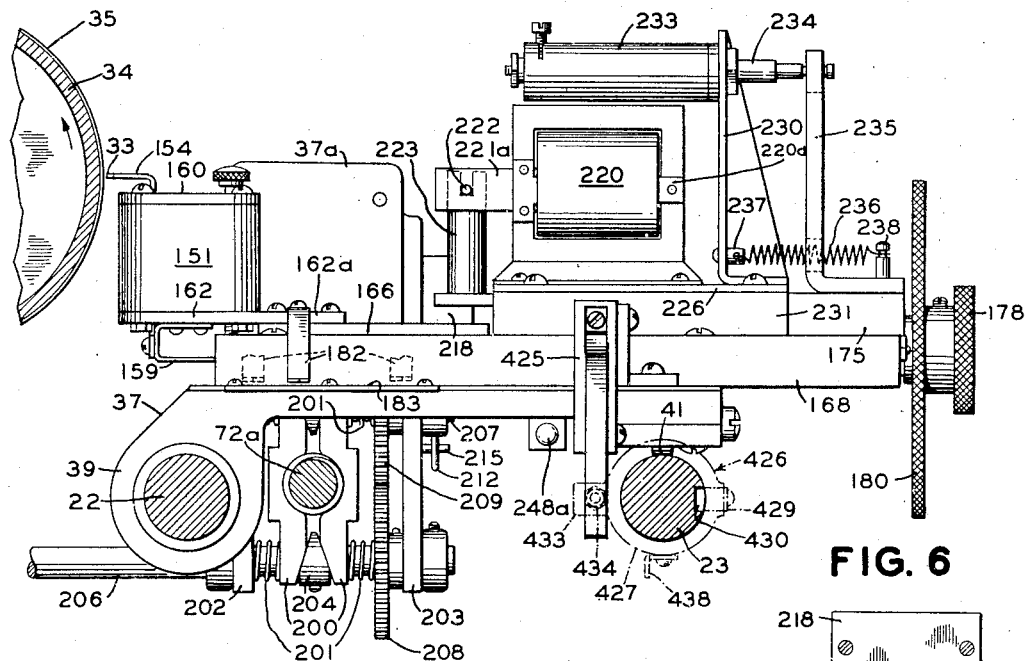
Fig. 4 is a section taken along the line 4—4 of Fig. 2, showing certain details of the recording unit.
Figure 6:
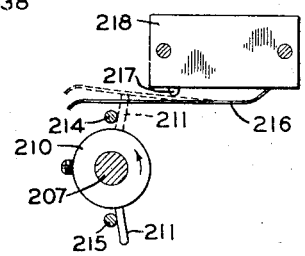
Figure 5:
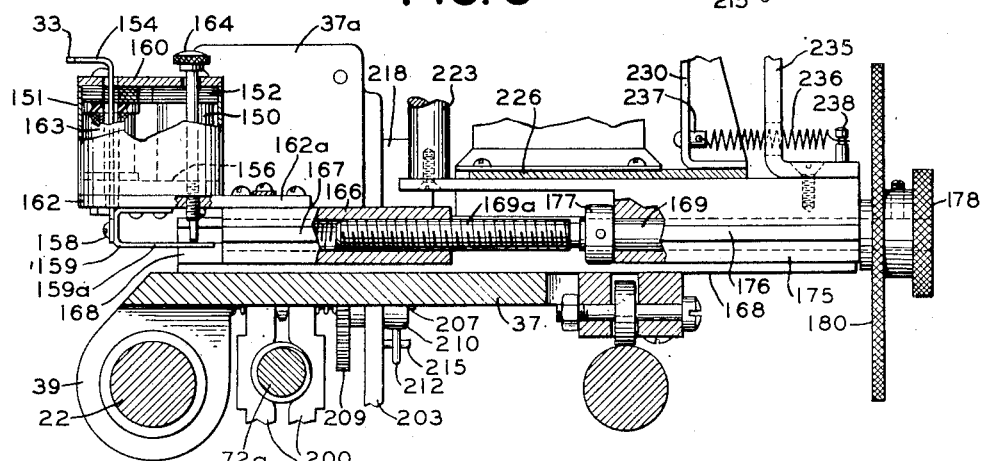
Figure 10:
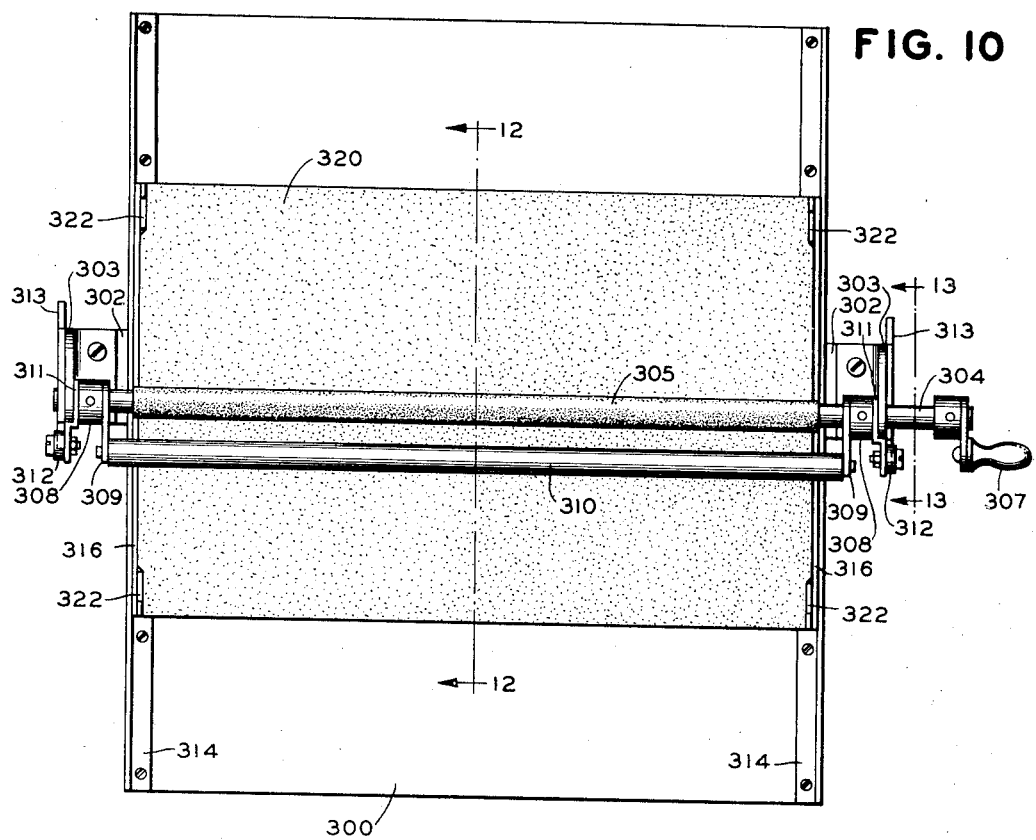
Figure 11:
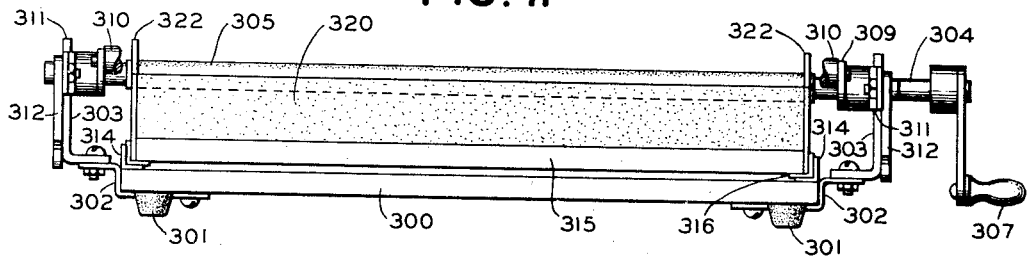
Figure 12:
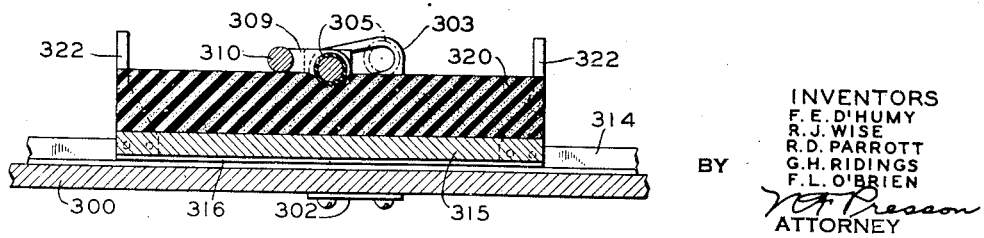

Fig. 5 is a view similar to Fig. 4 with certain portions broken away;

Fig. 6 is a detail view of a switch control device employed in the recording unit;

Fig. 7 is a plan view of another embodiment of the invention;

Fig. 8 is a fragmentary view of the recording drum and recording blank shown in Fig. 7;

Fig. 9 is a section taken along the line 9—9 of Fig. 8;

Figs. 10 and 11 are plan and side views, respectively, of a device for preforming the recording blank shown in Figs. 7 and 8;

Fig. 12 is a section taken along the line 12—12 of Fig. 10;

Fig. 13 is a fragmentary sectional view taken along the line 13—13 in Fig. 10;

Figs. 14 and 15 show the method of preforming the recording blank of Figs. 7 and 8;

Fig. 16 is a plan view of a modified form of drum holding mechanism;

Fig. 17 is a section taken along the line 17—17 of Fig. 16;

Fig. 18 shows a modification of the arrangement of Fig. 16;

Fig. 19 illustrates diagrammatically the electrical features of a circuit which may be employed to interconnect the transmitter and recorder; and Fig. 20 illustrates diagrammatically certain control features of the transmitter and recorder apparatus.

Referring to the drawings, and particularly to Figs. 1 and 2 thereof, a base 20 forms the principal support for the apparatus and driving and control mechanism therefor, which base is adapted to rest upon an apparatus table or cabinet or other convenient support, a cabinet preferably being employed so that certain of the power unit and amplifier devices employed may be embodied therein.

Secured to plates 20a and 20b on the base 20 are brackets 21 in which are mounted a front track or guide rail 22 and a rear track or guide rail 23 which slidably support the longitudinally movable transmitting scanning assembly 25 and the recording scanning unit 26. Preferably, and as shown, the transmitting scanning unit 25 comprises an optical pickup system for deriving signals from an original blank 29 which carries the subject matter to be reproduced or duplicated, the blank being secured upon a cylindrical drum portion 30 of a copy holder which is indicated in its entirety by the reference numeral 31. The copy holder 31 includes a cylindrical drum portion 34 adapted to support a recording blank or master copy 35 which is acted upon by the stylus 33 of the recording unit 26.

The transmitter scanning assembly 25 and the recording unit 26 are respectively mounted on base or carriage members 36 and 37, which base members are provided with a suitable number of front guide blocks 38 and 39 slidably mounted on the front guide rail 22, the carriage members having rollers 40 and 41 which cooperate with the guide rail 23 to facilitate travel of the units 25 and 26 along the guide rails. The carriage member 37 of the recording unit is secured to the carriage member 36 of the transmitting unit, as by a carriage link 42, shown in Fig. 2, so that any movement of the recording unit longitudinally along the guide rods 22 and 23 will impart a similar movement to the transmitting unit 25 and vice versa.

Power for operating the apparatus is supplied by the motor 50, which preferably is of the synchronous alternating current type, or, if desired, may be of the direct current type, it being understood that, if necessary, the speed of the motor for any given operation my be adjusted and maintained constant by any of the various suitable means known in the art for this purpose. The power preferably is applied by the motor 50 through the medium of a reducing gear mechanism 51. Secured to and rotatable with the driving shaft 52 of the reducing gear mechanism are driving gears 53 and 54 which respectively coact with driven gears 55 and 56 that are slidably movable within predetermined limits along a spline 57 on a driven shaft 58 which causes rotation of the transmitting and recording drums 30 and 34, in the direction indicated by the arrow on drum 30, during the scanning operations, the gears 55 and 56 being shiftable along the spline 57 by a drum speed shift lever 60, pivoted at 60a, Fig. 2, in order to change at will the peripheral speed of rotation of the drums 30 and 34. As shown in Figs. 1 and 2, gear 54 drives gear 56 when the drum speed shift lever 60 is in the position shown in the figures. Preferably, and as shown, gears 54 and 56 have a 1:1 ratio so that the drums 30 and 34 may be rotated at a speed determined by the motor 50 and reduction gearing 51, and which is well adapted for medium size drums such as shown in Figs. 1 and 2, and also is adapted for smaller size drums hereinafter referred to. If the drum speed shift lever 60 is moved to the left, as viewed in the figures, gears 54 and 56 are disengaged, and gear 55 is caused to mesh with gear 53. The gears 53 and 55 may have, for example, a 1:2 ratio, and thus the drums 30 and 34 will be caused to revolve at a lower speed.

An advantage of the drum speed shift arrangement is that the linear scanning speed for the drums 30 and 34 may be changed, if desired, or when drums of different diameters are used in place of the drums shown, as, for example, drums of a larger diameter to accommodate larger blanks, the number of revolutions per minute of the drums may be reduced to an extent such that the peripheral speed of rotation and hence the linear scanning speed will remain the same. The gears may be so chosen that the linear scanning speed is caused to remain approximately the same, irrespective of the size of drums employed. For the sake of simplicity gear trains providing for only two changes in the speeds of the drums are illustrated in the drawings, since as a practical matter and within certain limits one drum speed may be used for medium size and smaller size drums, and a lower drum speed for drums larger than the medium size drums, but it will be understood that suitable gear trains or equivalent means may be used to give as many different speeds as may be desirable depending upon the nature of the device and the various sizes of the blanks to be used for transmitting and recording purposes. A friction drag device 61 for maintaining a slight drag on the shaft 58, by means of a felt or other suitable element in frictional engagement with the shaft, eliminates backlash or other jerky movement which might be introduced due to the action of the gears.

Figure 3:
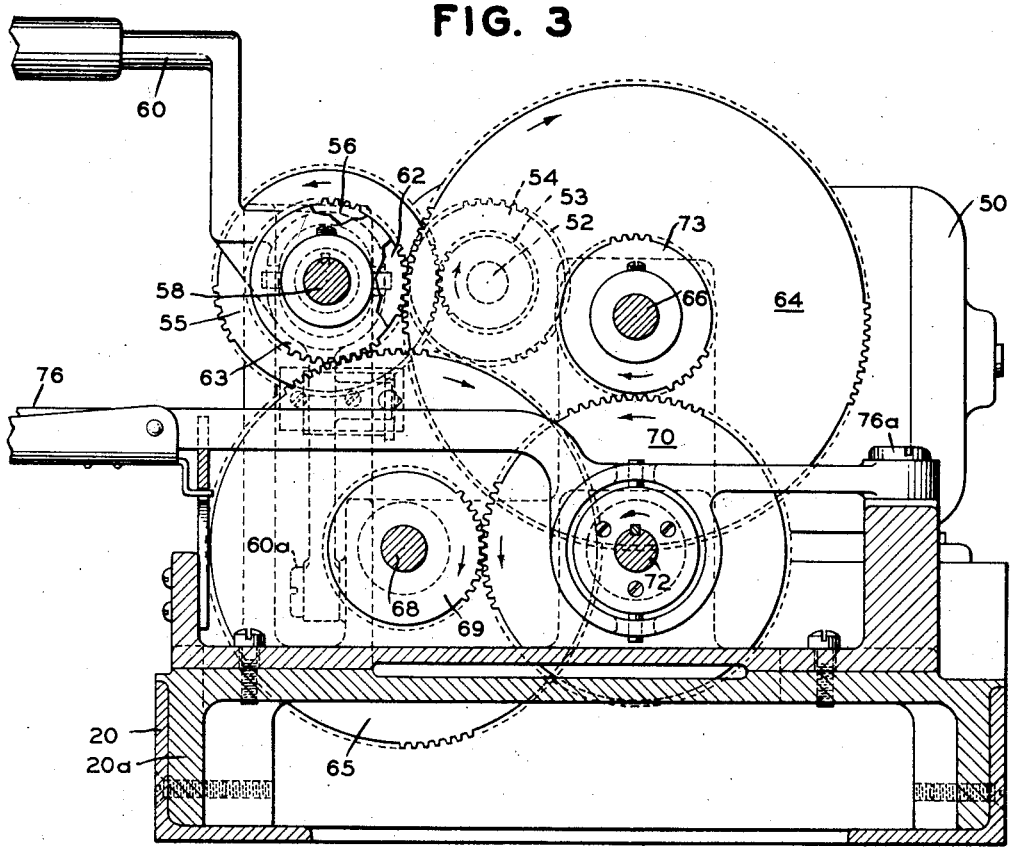
Fig. 3 is a section taken along the line 3—3 of Fig. 1, showing certain details of the driving gear mechanism employed.

Secured to the shaft 58 and rotatable therewith are two driving gears 62 and 63 (Figs. 1, 2 and 3), which gears respectively mesh with larger driven gears 64 and 65. Gear 64 is secured to and drives a stub shaft 66 which is journaled in bearings at each end thereof as shown. Gear 65 is secured to and drives a stub shaft 68 journaled in bearings at each end thereof. The stub shaft 68 also carries a smaller gear or pinion 69 which drives a larger gear 70, the gear 70 being mounted on a feed screw shaft 72 and slidably movable within predetermined limits along a spline 71 on the shaft (see Fig. 3), and serving to drive the feed screw 72 for causing line feed of the recording unit 26 as recording proceeds, a corresponding line feed of the transmitting unit 25 being effected by means of the mechanical connection including the carriage link 42 hereinbefore referred to.

Also secured to the stub shaft 66 is a small driven gear 73. When line feed shift lever 76, pivotally mounted at 76a, is shifted to the left from the position shown in Figs. 1 and 2, it causes disengagement of the gears 69 and 70, and shifts the gear 70 into engagement with the smaller gear 73 to decrease speed of rotation of the feed screw 72 and hence increase the number of scanning lines per inch. For example, when the shift lever 76 is in its right hand position as shown in the drawings, the gear ratio may be such that the transmitting and recording units scan 100 lines per inch, that is, as the cylinder 31 rotates once the scanning assemblies will move longitudinally a distance of a hundredth of an inch, whereas when the lever 76 is shifted to the left the gear ratio may be such that the number of scanning lines is increased to 120 per inch. This arrangement enables the number of scanning lines per inch to be made such as to give the most desirable results depending upon the subject matter scanned and the kind of service for which it is used. The gear ratios of the gearing above described and the pitch of the threads 72a on the feed screw 72 are so selected that the rate of longitudinal travel of the base members 36 and 37 of the transmitting and recording units and the peripheral speed of rotation of the cylinder 31 cooperate to produce the proper helical scanning of the blanks on the drums 30 and 34 of the cylinder. For the sake of simplicity gears providing only two different rates of line feed are shown, although it is to be understood that suitable gearing or equivalent means may be employed to product as many different line feeds as may be desired.

It will be noted that the line feed screw 72 is controlled through the gears 62 and 63 on the drum driving shaft 58, so that when the drum speed is changed, as by shifting the lever 60 from its right hand position to its left hand position, with resultant decrease in the speed rotation of the drums, for example, when larger drums are employed, the speed of rotation of the line feed screw 72 will be decreased, and for each rotation of the larger drums the transmitting and recording scanning assemblies will move longitudinally the same distance as they did with the smaller drums (for a given setting of the lever 76), and thus automatically prevent distortion which might be introduced if the speed of rotation of the feed screw 72 were not changed to correspond to the changed drum speed.

The cylinder 31 has reduced ends 80 and 81 formed with internal tapered surfaces which receive complementary bearing members 82 and 83. The member 82 is secured to and driven by the shaft 58 hereinbefore referred to, and serves to drive the cylinder 31. The member 83 is secured to a shaft 84 journaled in fixed upright bearing members 85 and 86 so as to be freely rotatable and also slidably movable longitudinally within the bearings to permit entry and withdrawal of the member 83 from the recessed portion of the end 81 of the cylinder 31, and thereby permit ready insertion and removal of the cylinder 31 and drums 30 and 34.

To facilitate the insertion and withdrawal of the member 83 there is provided a tapered cam member 90 fixedly secured to the bearing support 85, and coacting with this cam member is a second tapered cam member 91 which is secured to the shaft 84, as by means of a set screw 92. Secured to the cam member 91 is a handle 93, and when the handle is raised upwardly as viewed in Figs. 1 and 2, this causes rotation of the cam 91 relative to the fixed cam 90, and the adjacent tapered camming surfaces of these members coact to cause the member 91 to be shifted to the right as viewed in the figures and thereby cause longitudinal movement of the shaft 84 and withdrawal of the bearing member 83 from the recessed end 81 of the cylinder 31, after which the cylinder may be slid to the right a distance sufficient to release the opposite end 80 from its associated drive member 82. The cylinder may then be removed from the machine and replaced by another cylinder with other subject matter thereon, or the same cylinder may have other blanks 29 and 35 applied thereto and be replaced in the machine for a subsequent recording operation.

It will be seen that the cam member 91 has a flat portion 91a which, when the handle 93 has been turned to the cylinder releasing position, will cause the surface 91a to bear against a similar flat surface on the fixed cam member 90, thereby to avoid the possibility of the member 91 accidentally slipping from its releasing position. A compression spring 96 which loosely surrounds the outer end of the shaft 84 causes the member 91 to return to the working position when the handle is turned downwardly, the spring also causing the bearing member 83 to enter the end 81 of the cylinder thereby to insure that the adjacent end of the cylinder is properly supported during rotation of the cylinder, and also to insure that a proper driving connection will be maintained between members 80 and 82. In order to minimize frictional effects between the end 81 of the cylinder and the member 83, the latter may have embodied therein suitable bearings, such as ball bearings carried in a raceway, so as to be freely rotatable about the shaft 84.

Fixed bracket members 100 and 85 are provided, each of the bracket members having two arcuate supports or saddles, the inner pair of saddles 100a and 101a preventing the cylinder 31 from dropping when it is released from the bearings 82 and 83, and the outer pair of saddles 100b and 101b of the brackets providing a convenient rest for the cylinder 31 to enable the blanks to be applied to and removed from the drums 30 and 34 at the beginning and termination of the reproducing operation.

In the broader aspect of the invention any suitable transmitting unit and any suitable recording unit may be employed. For example, the transmitting unit may comprise a photo-cell pickup device of a type heretofore employed in the art for scanning subject matter to be transmitted in facsimile, such as the scanning device shown in the patent to R. J. Wise, No. 2,158,391, issued May 16, 1939, or as disclosed in an application of R. J. Wise et al., Ser. No. 110,760, filed November 13, 1936, now Patent No. 2,255,868, issued September 16, 1941. In general, such a scanning unit comprises a lens tube 104, Fig. 2, which usually contains two lenses and an apertured plate designed and positioned with respect to each other so that light from an exciter lamp is concentrated in a spot on the periphery of the drum 30 and consequently on the subject matter sheet 29 thereon, the tube 104 being provided with telescopic sections to enable focusing adjustments. A lens tube 106 contains lenses for directing the beam of light reflected from the periphery of the drum 30 or the record sheet 29 onto an aperture and thence to a photo-cell. A light chopper in the form of a disc 107 is inteposed between the photo-cell and the aperture referred to, the number of notches in the disc 107 and the speed of rotation of the disc being variable within wide limits depending on the desired rate of scanning, the constants of the communication circuits employed, and other factors. As is well known, the signals generated by the photo-cell, which are in accordance with the subject matter scanned by the transmitting unit 25, are amplified and caused to operate the recording mechanism 26 in a manner to reproduce on a recording blank the subject matter in facsimile as it appears on the record blank 29.

To insure high fidelity in transmitting and fine sharp definition in recording, it is essential that the transmitting scanning apparatus and also the recording apparatus be very accurately positioned with respect to the spacing between the scanning elements of these units and the blanks containing the subject matter thus transmitted and recorded.

Figs. 1 and 2 show suitable means for quickly and accurately adjusting the scanning elements of the transmitting unit 25 with respect to the surface of the transmitting drum 30. It will be noted that the transmitting unit is mounted on a carriage 110 having guide members 111 which travel in slots in guides 112, the guides 112 being firmly secured to the frame 36. Frame 110 has secured thereto upstanding bracket members 113, Fig. 1, which provide bearings for a screw-threaded rod 115 having at the outer end thereof a knob 116 for rotating the rod. The screw-threaded portion of the rod 115 is received within a threaded block 118, the latter block being fixedly secured to the carriage 36. The rotation of the rod 115, which is held against longitudinal movement by the bracket members 113, causes the scanning assembly 25 to be moved towards or from the transmitting drum 30, thereby to provide a proper adjustment or spacing between the scanning elements and the blank 29 on the drum, irrespective of the size of the transmitting drum employed.

The carriage 110 also carries a pointer 119, which coacts with a plate 120 secured to the support 36, the latter plate bearing indicia such as the letters A, B and C, which respectively correspond to three different sizes of transmitting drums that may be employed. If a small drum corresponding to size C is to be employed, the knob 116 is turned until the pointer 119 is opposite the mark C on the plate 120; if a medium size drum is used, the scanning assembly is adjusted so that the pointer 119 is opposite the mark B on plate 120; and if a large size drum is employed, the position of the transmitting unit 25 is adjusted so that the pointer is opposite the mark A on the plate 120. Secured to the forward end of the rod 115 is a graduated drum or vernier 122 for enabling very accurate adjustment of the scanning elements of the optical pickup system relative to the record sheet, and coacting with the vernier is a pointer 123, seen in Fig. 2, which pointer is fixedly secured to the carriage 110.

The transmitting and recording drums 30 and 34 are shown as having the same diameter and being integral with the cylinder 31 in Figs. 1 and 2, but it is to be understood that either of these drums may differ in diameter from the other in order that the recorded subject matter may be either enlarged or reduced with respect to the original, depending upon whether the recording drum is larger or smaller than the transmitting drum. Any distortion introduced into the enlarged or reduced subject matter by reason of the fact that the line feed of the transmitting and recording drums is the same, may be obviated by taking the recorded sheet after one complete scanning operation has occurred and turning the sheet at right angles and placing it on the transmitting drum and then re-recording the subject matter, and the re-recorded blank will not have introduced therein the distortion above referred to. In accordance with another embodiment of the invention, hereinafter described, in which means are provided for producing different line feeds of the transmitting and recording drums, the enlarging and reducing operations are materially simplified. It is to be understood that the cylinders 30 and 34 may comprise separate cylinders which abut at the adjacent inner ends thereof instead of comprising a single cylinder such as the one illustrated, and in the other embodiment referred to means are shown whereby the separate drums may be caused to interengage with each other at their adjacent ends.

Preferably, and as shown in Figs. 1, 2, 5 and 6, the recording unit 26 is of the type disclosed in the copending application of F. L. O'Brien and P. H. Estes, Ser. No. 283,954, filed July 12, 1939, now Patent No. 2,260,862, issued October 28, 1941. Such a recording unit comprises two cylindrical permanent magnets 150 enclosed within the unit 151 (one of which magnets is shown in dotted outline in Fig. 5), one of the magnets being inverted with respect to the other so that they are of opposite polarity. Upper laminated pole pieces 152 overlap the free end of the armature 154, and a lower pair of laminated pole pieces 156, similar in outline to the upper pair of pole pieces, but reversed in position, extend from the lower ends of the permanent magnets 150 to overlap the armature adjacent its connection at 158 to a U-shaped member 159, Figs. 4 and 5. The upper pole pieces are secured to a non-magnetic metallic plate 160, as by rivets, and the lower set of pole pieces are secured in a similar manner to a non-magnetic metallic plate 162, to which one leg of the U-shaped member 159 also is secured, as by rivets. The top and bottom plates 160 and 162, including their respective pole pieces, are clamped to the permanent magnets, as by means of bolts one of which is passed through each of the magnets. An energizing coil 163, Fig. 5, surrounds and controls the armature 154 and is firmly held in position within the unit 151. The stylus 33 preferably consists of a U-shaped piece of wire soldered, welded or otherwise secured to the armature 154, or, if desired, may be formed by shaping the end of the armature so that it will be similar in configuration to the wire stylus. The member 159 is a strip of spring steel and has one end 169a that bears against an adjusting screw 164 which is threaded in the bottom plate 162. Adjustment of the screw 164 adjusts the bias of the armature 154 and stylus 33 with respect to the recording drum.

The resonant vibrational frequency of the armature 154 is preferably higher than the highest electrical frequency impressed on the coil 163. It will be understood by those skilled in the art that the maximum modulation frequency derived from the pickup device 25 will be determined by the speed of the drum 30 and the nature of the original being scanned for reproduction. For example, if the drum is rotated at 90 R. P. M., the unit 151 is preferably designed so that the resonant frequency of the armature when vibrating freely, preferably is of the order of 800 cycles. With the unit in operative position with respect to the drum 34, the resonant frequency drops to approximately 650 cycles which is still of a value great enough to prevent the stylus 33 from rebounding to such an extent as to affect the quality of appearance of the record.

The unit 151 is mounted by means of an extension 162a on the plate 162, on a slide member 166 which has tongues 167 received within grooves in guide rails 168, and the member 166 with the unit 151 is adjustable towards and away from the recording drum 34 by means of a rod 169 having a threaded portion 169a received within a threaded portion of the plate member 166. The rod 169 passes through a block 175 having tongues 176 also received within grooves in the guide rails 168. The rod 169 has a collar 177 and a knob 178 secured thereto, each of which elements abuts against an end of the block 175, Fig. 5, whereby when the knob 178 is rotated the action of the threaded portion 169a of the rod 169 will cause the unit 151 to move towards or from the recording drum 35, thereby to provide the proper spacing between the stylus 33 and the recording sheet, irrespective of the size of the recording drum employed. A graduated dial or vernier 180 (Figs. 2, 4 and 5) secured to the rod 169 enables very accurate adjustment of the recording stylus 33 relative to the record sheet. Also carried by the slide 166 is a pointer 182, seen more clearly in Figs. 1 and 2, which coacts with the plate 183 secured to the carriage member 37, the plate 183 bearing indicia, such as the letters A, B and C, which respectively correspond to three different sizes of drums to be employed. If a small drum corresponding to size C is to be employed, the knob 178 is turned until the pointer 182 is opposite the mark C on the plate 183. If a medium size drum is to be employed, the unit 151 is adjusted to cause the pointer to be opposite the mark B; and if a still larger drum is employed, the position of unit 151 is adjusted so that the pointer 182 is opposite the line A of the plate 183. In each of the foregoing cases a more accurate adjustment is provided for by the vernier 180.

The line feed of the transmitting and receiving units is effected by means of a split block assembly comprising identical opposed split halves 200, Figs. 4 and 5, which members are internally threaded to receive the feed screw thread 72a, the members being spring-pressed into engagement with the threads of member 72a by means of four compression springs 201 which act between support members 202 and 203, and the upper and lower portions of the members 200. The members 202 and 203 comprise the legs of a U-shaped bracket which is secured to an upstanding lug 37a on the carriage 37. Interposed between the inner tapered surfaces of the opposite ends of members 200 are two wedge-shaped members 204, the lower member 204 being secured to a split-nut release lever rock shaft 206, and the upper wedge-shaped member 204 is mounted on a rock shaft 207, the shaft being rotatably mounted in members 202 and 203. Member 204 on shaft 207 is operatively connected to the shaft 206 by means of gears 208 and 209. When the handle 206a (Fig. 1) of the shaft 206 is rotated so as to turn the wedge-shaped members 204 from the positions in which they are shown in Fig. 4, rotation of these members forces the split nuts 200 apart a sufficient distance to effect their release from the threaded rod 72a, and thus enable both the transmitting and receiving units to be moved longitudinally to any position, such as their initial starting position, after which the rod 206 is again turned in a direction such that the wedge-shaped members 204 assume the positions shown in Fig. 4 and again make effective the feed screw 72a.

In order that there may be no likelihood of injury to the blank by the stylus 33 when a recording operation has been completed, and particularly when the transmitting and receiving units are to be moved to their initial starting positions, a collar 210 shown in detail in Fig. 6, is secured to the rock shaft 207, the collar 210 carrying a pin 211, which pin coacts with stop pins 214 and 215 mounted on the bracket member 203. Pin 211 is adapted to cooperate with a spring member 216 and operating member 217 of a stylus retractile switch 218 also mounted on the bracket 203, and seen more clearly in Fig. 1. The switch 218 controls the energizing circuit of a solenoid 220 which, when energized, causes retraction of its core 221 which has secured thereto two side plates 221a, and the inner movement of this core causes corresponding movement of a pin member 222 secured thereto, the latter member being positioned within a slot in a post member 223 secured to the slidable block 175, and thus through the rod 169 and block 166 which carries the device 151, causes withdrawal of the stylus a predetermined distance from the recording drum when solenoid 220 is energized by closure of switch 218, the limit of this retractile movement being determined by the core 221 striking the stop member 220a on the frame of the solenoid 220 when the stylus is in its proper retracted position.

The plate 226 supports the solenoid magnet structure 220 and also supports a bracket member 230, plate 226 being secured to a block 231 which in turn is secured to the guide members 168. Bracket 230 carries a dashpot 233, the plunger 234 of the dashpot being received within and actuatable by the upper end of a bracket member 235, the bracket 235 being secured to the block 175. A retractile spring 236 has one end thereof secured at 237 to the bracket member 230, and the other end thereof secured to a post 238 fixedly mounted on the bracket 235, the spring serving to urge the recording unit towards the drum 34, the movement of the recording unit in this direction being limited by engagement of the inner end of the knob 178 with the end of the member 168. When the retractile magnet 220 is energized to withdraw the stylus from the drum in the manner aforesaid, the spring 236 is further extended. The dashpot 233 eases the impact of the stylus with the drum when the magnet 220 is deenergized, by reason of the fact that the bracket member 235 at this time is caused to move to the left, as viewed in Figs. 4 and 5, under the influence of spring 236, and in so doing causes the plunger 234 of the dashpot to move inwardly, the dashpot insuring that the stylus will gently contact the recording medium 35 on the drum 34.

The original copy sheet 29 is wrapped around the transmitting drum 30, preferably in such a manner that the top of the copy is at the left hand end of the drum when facing the machine, the right hand edge of the copy overlapping the left hand edge by a slight margin. The copy may be held in position by any suitable means, such as an elastic band or garter 240 which preferably, although not necessarily, comprises a helical spring in the form of an annulus such as disclosed and claimed in the aforesaid copending application of R. J. Wise et al., Ser. No. 110,760, filed November 13, 1936, Patent No. 2,255,868. As shown in Fig. 1, the leading garter member is advanced axially along the drum 30 from left to right as scanning proceeds, by a garter pushing plate member 241 secured to the supporting frame 110, and the trailing garter member 240 is advanced by a second pusher plate 242 on the transmitting unit. The two elastic bands 240 are thus kept within a predetermined distance of each other and are kept immediately adjacent to the place where scanning is being effected, the bands rolling along on the copy sheet as the scanning proceeds, and holding the copy sheet tightly against the drum and preventing distorting in the optical scanning system which otherwise might occur if the copy was not held tightly against the drum. In order to prevent the trailing garter member 240 from jumping forward or otherwise interfering with the scanning light ray, the plate member 241 is made sufficiently wide so that if the trailing member 240 should jump forward, it will be stopped by the member 241 before it can interfere with the scanning light. Two similar garter members 240 are employed to hold the recording blank 35 on the drum 34, and for certain purposes these members may be placed adjacent to the ends of the blank 35, as indicated in Fig. 1.

In order to prevent injury or shock to the transmitting and recording units when they are moved to their initial starting positions, there is provided a buffer in the form of a dashpot 245 mounted on the frame structure 26a, the dashpot having a plunger 246 which is held in its extended position by a compression spring within the dashpot cylinder. When the transmitting and receiving carriages are returned to the left, an adjustable stop member 247, shown in dotted outline in Fig. 1, secured to the carriage of the transmitting unit, engages the end of the piston 246, and as the movement of the units towards the left is continued, the spring within the dashpot 245 is compressed so that it prevents undue shock on the units, the structure also providing a suitable means for limiting the extent of movement of the units toward the left and determining a desired initial starting position of the units. At the left hand end of the frame 20, as shown in Figs. 1 and 2, is mounted a limit switch 248 which is engageable by an actuating member 249 secured to the carriage of the recording unit 26. If the apparatus is not stopped after scanning has been completed, continued line feed travel of the transmitting and recording units will cause the member 249 to engage the limit switch 248, which switch operates to open the energizing circuit of the driving motor 50, and thus prevent injury which might otherwise be caused by overtravel of the units.

For producing master copies, readily obtainable Mimeograph stencil sheets may be employed, and when the unit 26 is to be used for recording on one of these sheets, the knob 178 may readily be set so that the stylus is spaced the proper distance from the surface of the sheet to give the desired results. In general, the setting of the knob 178 is such that the wax, which coats the fibrous structure of the sheet, is pressed or plowed away to make the fibrous structure pervious to Mimeograph ink without destroying its original form, and for this reason a Mimeograph ink of lower viscosity may be used.

Where hectographic carbon paper is employed, a sheet of hectograph carbon paper is placed over a sheet of hard finish white paper and the combination placed on the recording drum in such manner that the white paper is next to the drum. The hectographic carbon paper plus the white paper underneath may have a thickness of approximately .005 of an inch, and for recording with such paper the tip of the stylus may be spaced the proper distance, for example, of the order of .010 of an inch away from the surface of the recording drum when the magnet 163 is deenergized.

In the embodiment of the invention illustrated in Figs. 7 to 9 of the drawings, the transmitting and recording drums 30a and 34a comprise separate cylinders so that enlargement or reduction of the reproduced copy may more readily be obtained, and without the necessity of employing long cylinders such as 31 in Fig. 1, which when machined or formed to provide drums of different sizes are relatively expensive. The transmitting cylinder 30a, which in the form shown in Fig. 7 is larger than the recording cylinder 34a, has its inner end 30b formed with a reentrant or flanged portion such that it receives the end 34b of the recording cylinder 34, so as to be in driving relation therewith as indicated in dotted outline in the figure. As illustrated, the relative sizes of the transmitting and recording drums will cause the recorded or master copy to be reduced with respect to the original copy. It will be understood, however, that the smaller or medium size drum 34a may be used for transmitting and the larger drum for receiving, so that an enlargement of the original is produced. Also, if desired, the transmitting and recording drums may have the same diameter, while retaining the advantages of using separate drums or cylinders for transmitting and recording purposes.

The embodiment illustrated in Fig. 7 also has the advantage of reproducing the original copy, which may be reduced or enlarged with respect to the original, without introducing distortion in the recorded copy and thus obviating the step of re-recording the copy to eliminate any distortion that may be introduced with the apparatus of Figs. 1 and 2. For this purpose, separate feed screws are provided for the transmitting and recording units, the line feed screw shaft 250 being driven from the motor and gears shown on the left hand portion of Fig. 1 (which are indicated at D in Fig. 7 in which the driving units are shown as enclosed within a casing 249) and serving to provide a line feed for the transmitting unit, while a separate line feed screw shaft 272 is provided for the recording unit 26. On the right hand end of the feed screw shaft 250 are three gears 260, 261 and 262 which engage a spline 250b on the shaft, the gears being shiftable along the spline by means of a feed screw shift lever 264 which is pivotally mounted at 265 to the apparatus frame. The gears 260, 261 and 262 are adapted respectively to mesh with driven gears 270, 271 and 273 to provide different driving ratios for the shaft 272.

With the lever 264 in the position shown in Fig. 7, the feed screw 272 for the recording unit 26 is driven at a lower rate of speed than the feed screw 250 of the transmitter unit so that the reproduced record or master copy will not have introduced therein any distortion, the number of scanning lines per inch being increased thereby to correspond to the degree of reduction of the subject matter as caused by the smaller diameter of the recording cylinder 34a. If the line feed shift lever 264 is shifted, as by moving the handle 264a to the left, so that gear 261 meshes with gear 271, a 1:1 ratio between the feed screw shafts 250 and 272 is obtained, and thus the apparatus is adapted to operate with a recording drum of the same size as the transmitting drum. Further movement to the left of the handle 264a of the shift lever causes the gear 262 to mesh with gear 273, and thus the rate of feed of the screw 272 is higher than the screw 250, thus enabling a larger drum to be used for recording than is used for transmitting, thereby to enlarge the recorded subject matter, the rate of increase of the line feed of the screw 272 being such as to compensate for the enlargement of the recorded copy and thus prevent distortion. It will be understood that as many different gear ratios between the feed screws 250 and 272 may be provided as may be desirable or necessary depending upon the different relative sizes of the transmitting and recording drums employed.

A split nut release unit 251 for the transmitter 25 is provided, which unit may be substantially the same as that shown in Figs. 4 and 5 for the recording unit, and rotation of the lever 256, by means of the handle 256a, will cause the split nut assembly to be disengaged from the threaded portion 250a of the feed screw 250 to enable the transmitting unit to be moved along the guide rods 22 and 23 to any desired position, while the recording unit 26 is independently movable since it has a split nut release unit like that shown in Figs. 4 and 5 of the drawings.

In addition to the use of Mimeograph stencil sheets, hectograph carbon paper, and the like, the recording unit is adapted to produce a master copy on a metallic planographic printing plate or sheet of zinc, aluminum or other suitable material, various of which plates or sheets are well-known, and from which any desired number of copies may be printed. In general, planographic printing from these plates depends upon the immiscibility of oil and water and the preferential retention of the greasy image-forming substance by the image areas and a similar retention of an aqueous dampening fluid by the non-image areas, the plates being treated in such manner that they are "sensitized" to ink. After the image has been delineated on the plate, as by means of the recording unit 26, the non-image areas are "desensitized" and the plate prepared for printing by suitable treatment with various solutions known in the art. One form of planographic printing sheet suitable for the purpose is an aluminum sheet prepared in the manner disclosed in the patent to G. S. Rowell, No. 2,129,071, issued September 6, 1938, one of which sheets is indicated by the reference numeral 275 in Figs. 7 to 9. Preferably, and as shown, the plate has each end thereof escalloped to provide projecting ears 276 for securing the plate on a printing drum of an Addressograph or Multigraph machine, preparatory to printing copies from the plate, in such manner that the plate and the holding device on the printing drum have mutually overlapping portions occupying the same cylindrical surface thereby to provide a continuous engagement of the surface of the inking roller of the Multigraph or Addressograph machine when copies are being reproduced from the master copy or plate, as disclosed in the patent to W. R. Allen et al., No. 1,967,221, issued July 24, 1934.

In the form of recorder shown in Figs. 7 to 9, the planograph printing sheet 275 is applied to the recording drum 34a with a sheet of paper or other suitable transfer medium carrying a greasy ink-retaining image-forming substance which may, if desired, have coloring matter incorporated therein so as to make the image readily visible on the printing sheet. It will be understood that the metal sheet and transfer sheet may be placed on a flat bed or platen during scanning if used in facsimile apparatus of the flat bed type. With the cylindrical form of recording platen, the sheet 277 is placed on the outer periphery of the sheet 275, the sheet 277 being adapted to be engaged by the percussion stylus 33 as the scanning operation proceeds so as to produce on the surface of sheet 275 a facsimile copy of the transmitted subject matter. It will be noted that the leading edge of the carbon sheet is placed beneath the trailing edge of the sheet 275, as shown in detail in Figs. 8 and 9. The sheets are held snugly against the surface of the recording drum in proper scanning position by means of a garter member 278 which preferably comprises a helical spring 240a in the form of an annulus, the spring being surrounded by short lengths or beads 279 of rubber tubing or the like, the rubber tubing preventing the convolutions of the coil spring 240a from bearing on the surface of the carbon paper 277 and thereby prevent accidental pressure on the carbon paper from producing marks on the sheet 275 due to the rolling action of the garter. It will be appreciated that any mark accidentally made on the sheet 275 by the action of the garter 278 would result in undesirable marks or smudging on the printing plate. When a sheet such as the aluminium sheet 275 is employed, and particularly when the sheet is shaped or preformed in a manner hereinafter described, only one garter member need be employed, providing this member is caused to be maintained at a place adjacent to the place where the printing plate is being scanned by the recording stylus. To effect this, the recording unit has mounted thereon a plate 280 which serves as a pusher and causes the garter member to roll axially along the recording drum as the scanning operation proceeds.

A metal planograph printing sheet or plate, such as the aluminum sheet 275 shown in Figs. 7 to 9, is appreciably stiffer than paper, stencil or hectograph sheets, and it is advisable to shape or preform the metal sheet before applying the same to the recording drum in order to prevent creasing of the sheet and to insure that neither the leading nor the trailing edges of the sheet will project beyond the periphery of the remainder of the sheet, which might cause vibration of or injury to the stylus 33 during the recording operation. A method of and apparatus for preforming such sheets so that the sheets including the leading and trailing ends or edges thereof will lie snugly against the recording drum is shown in Figs. 10 to 15 of the drawings. Referring to these figures, there is shown a preforming or curling apparatus comprising a generally flat rectangular base member 300 which may be made from wood, Bakelite, metal or other suitable material, the base member having feet or legs 301 which preferably are of resilient material to avoid marring of the desk, table or other support on which the preforming apparatus is supported. Rigidly secured to the base 300 are two side bracket members 302, which members in turn support upstanding bracket or bearing members 303.

As seen more clearly in Figs. 12 and 13, the members 303 each has a slotted portion 303a, these slotted portions comprising bearings for a shaft 304 that extends transversely across the top of the preforming unit, the shaft having thereon a coating of hard rubber or other suitable material which forms a roller 305 for engaging the upper surface of the metal printing plate during the preforming operation. The shaft 304 has a handle 307 by means of which the roller 305 may readily be rotated within the bearings formed by the slotted portions 303a of the members 303. Shaft 304 also has secured thereto, as by set screws, two collar members 308. Rotatably mounted on shaft 304, and adjacent to the inner sides of the collar members are link members 309 which carry a guide roller 310 that cooperates with the roller 305 during the preforming operation. Disposed adjacent to the outer sides of the collar members 308 are link members 311 which are loosely mounted on the shaft 304, the link members each carrying at its outer end a latch member 312. The latch 312 has notches or locking portions 312a and 312b which coact with a locking member 313 secured to the bracket 303, in order to lock the shaft 304 and roller 305 in either of its two operative positions, one such position being shown in full line in Figs. 12 to 15, and the other position being shown in dot-dash line in Fig. 12.

Mounted on the base 300 are two angle iron members 314 which serve as guide rails for carrying a carriage 315, the carriage having two angle iron members 316 secured thereto to insure that the carriage will slide easily in the guide rails 314. Secured to the carriage 315, as by glueing, is a pad 320 which preferably is composed of sponge rubber. In the position shown more clearly in Figs. 12 to 15, the shaft 304 is in position to curl or preform the aluminum sheet 275, at which time the roller 305 is forced into the upper surface of the pad 320 a sufficient distance to cause the necessary bending force to be exerted on the printing plate 275 when it is passed between the roller 305 and the surface of the pad 320. Fig. 14 shows the beginning of the preforming operation in which a flat metal sheet 275 has been placed on the upper surface of the pad 320 with the leading end of the sheet passed under the guide roller 310 and between the forming roller 305 and the adjacent surface of the pad, this being effected by turning the handle 307 so as to rotate the roller 305 in the direction indicated by the curved arrow in Fig. 14. Continued rotation of the roller 305 causes the pad and its carriage to travel in a longitudinal movement in a direction indicated by the straight arrow in Fig. 14, the carriage 315 sliding along on the guide rods 314 at this time.

Once the leading edge of the sheet 275 is caught between the roller 305 and the pad, the sheet is formed automatically as the handle 307 is rotated, this being effected by the pressure exerted by the roller 305 on the sheet 275 and the coacting surface of the pad 320. As the rotation of roller 305 is continued, this causes the sheet 275 to pass between the under surface of the roller and the surface of the pad, and in thus passing the sheet is bent and given a desired smooth arcuate configuration throughout as shown in Fig. 15, the pressure exerted by the roller 305 on the sheet and the resiliency of the pad being so chosen as to provide a curvature of the sheet such that it substantially corresponds to the outer periphery of the recording drum on which it subsequently is mounted.

After the recording operation has been effected on the printing plate, it is desirable to straighten the sheet 275 so that it is flat as it originally was, and this may readily be effected by the preforming apparatus in the following manner: The latch members 312 are released from the full line position shown in Fig. 13, after which the shaft 304 is slid to the upper end of the slot 303a to a position shown in dot-dash outline, and the latch member 312 rotated by hand so that its locking portion 312a is in engagement with the locking member 313, at which time, due to the upward slant of the slot 303a, the pressure exerted by roller 305 on the pad 275 is reduced to a value such that when the curved sheet 275 is inserted beneath the guide roller 310 and the roller 305, and the handle 307 again turned in the same direction as when the sheet was preformed, just sufficient pressure will be exerted by the roller 305 to flatten or straighten the sheet 275, it being understood that the curved sheet is placed on the pad 275 with its outer arcuate surface upwards.

The position of the roller 305 during the straightening operation is shown in dotted outline in Fig. 12, at which time the roller exerts a comparatively light pressure on the surface of the pad 305, this pressure being just sufficient to straighten the sheet 275 without introducing a reverse curve therein, the sheet thus being restored to its original flat condition whereby it may be placed on a printing machine for reproduction in any suitable manner. Preferably, and as shown, four upstanding stop members 322 are secured to the base 315 of the pad carriage to limit the extent of travel of the pad in either direction, the travel of the pad being sufficient to both preform and straighten the sheet 275.

In the embodiment illustrated in Fig. 7, the transmitting and recording drums have complemental projecting and recessed portions at the adjacent ends 30b and 34b such that the inner end of each drum supports the adjacent inner end of the other drum in driving engagement. However, if desired, a separate bearing or support may be secured to the base 20, having arcuate bearing surfaces which provide a support for the adjacent ends of the transmitting and recording drums thereby to insure that the axis of rotation of the drums will remain straight and true.

Fig. 19 of the drawings illustrates diagrammatically a preferred electrical system which may be employed in connection with the transmitter and recorder apparatus, although, as hereinbefore set forth, other known electrical systems suitable for transmitting and recording in facsimile may be employed, depending upon the purpose for which the apparatus is to be used, such systems including the systems disclosed in the aforesaid Patents Nos. 2,255,868 and 2,260,862.

In the system shown in Fig. 19 only one photocell 350 need be employed, an inversion of the transmitted signals being effected in the amplifier circuit in the manner hereinafter described. It will be understood that the photocell 350 receives modulated light from the original copy to be reproduced, and that an alternating current output is derived from the photocell by the use of a light chopper driven from a motor (not shown), which output is amplified by the amplifier 351 which may comprise several stages of amplification. Embodied in the amplifier is a gain control 352 for the purpose of adjusting the amplitude of the signals which are supplied to the recording unit, and as shown in Fig. 1, this gain control may be mounted on the transmitting unit 25 so that it is readily accessible to the operator of the machine.

The output of the amplifier 351 is connected by a double-pole double-throw switch 355 to the primary of a transformer 356. When the recorder is to be used for receiving signals from the transmitting unit 25, the switch 355 is thrown downwardly, as viewed in the figure, whereas if the recorder is to be used for receiving signals from a remote point over an incoming line L, the switch 355 will be thrown upwardly, so as to connect the incoming line to the primary winding of the transformer 356. Preferably, and as shown, a second gain or volume control device 357 is employed to enable the amplitude of the signals applied to the recorder to be adjusted in accordance with the characteristics of the amplifying apparatus employed. The secondary winding of the transformer 356 is connected to the grid of a thermionic amplifier 358 which preferably has a high amplification factor. The type 6K6 tube is an example of a vacuum tube suitable for the purpose. The output of the tube 358 is connected to the primary of a transformer 360, the secondary of this transformer being connected to a thermionic rectifier tube 361, the type 84 tube being an example of a rectifier suitable for the purpose. The output circuit of the rectifier tube controls the grids of two tubes 362 and 363; the type 6L6 tube is an example of tube for the purpose.

The plate circuit of the tubes 362, 363 may be connected to the recording unit 26 by a series circuit comprising conductor 364, double-throw switch 365 when in the position shown in full line in the figure, resistance 367, milliammeter 368, through the recording device 26, and thence through resistance 370 and conductor 371 to positive B battery 372. With the switch 365 thrown to the position indicated in dotted lines in the figure, a parallel connection of the plate circuit of tubes 362 and 363 is provided, one branch of which includes resistance elements 376 and conductor 371 to battery 372, the other branch comprising conductor 364, lower blade of switch 365, conductor 366, recording unit 26, milliammeter 368, and resistor 370 to ground at 378. A condenser 370a is bridged across resistance 370 in order to shape the signals so as to provide a square-front signal shape, which is desirable to insure prompt action of the stylus 33 of the recording unit 26. These alternative plate circuit connections, as determined by the position of the switch 365, enable either a positive copy or a negative copy to be produced by the recording unit 26, as explained in the following description of the operation of the circuit.

When signals are transmitted from a positive original for reproduction by the recorder as a positive copy, the carrier signals received at the recording amplifier from either the transmitter 25 directly or from the line L are further amplified by the tube 358. As above stated, the output of this tube is rectified by the tube 361, and the rectified signal is placed across a resistor load 380 in such manner that negative potential is applied to the grids of the tubes 362 and 363, the positive terminal of the resistor 380 being connected, by means of a switch 381 when in the position shown in the drawings, through a resistor 382 to a source of positive potential 383. With the switch 365 in the full line position shown in the figure, the coil of the recording unit 26 is placed in the plate circuit of tubes 362 and 363 in series with the plus B battery 372, the resistor 367 being an additional resistor which is inserted, with the switch in the full line position, to reduce the flow of plate current when producing a positive recorded copy from a positive original blank.

An incoming signal caused when the transmitter scans the white portion of the original blank, known as the background or non-marking signal, causes a negative potential to be placed on the grids of tubes 362 and 363, which overrides the positive potential placed thereon by the battery 383, and reduces the plate current to a minimum through the recording unit, at which time the stylus 33 is out of contact with the recording medium. When the incoming signal, as from a black character in the original copy, is lower in amplitude, the net potential on each of the grids of tubes 362 and 363 will be positive due to the preponderance of the positive battery 383, causing plate current to flow which, in turn, actuates the stylus against the recording blank, thus producing a mark in response to the signal from the transmitter. In this manner a positive copy is produced on the recording medium from a positive original at the transmitter, or if desired a negative copy may be produced on the recording medium from a negative original at the transmitter, although in the case of stencils it is desirable to transmit from a positive and reproduce a positive.

With the switch 365 thrown to the position indicated in dotted lines, the reproduced subject matter is inverted, as between the original and the recorded copy, since the recording unit 26 is removed from the above mentioned series arrangement of the plate circuit, and connected between the plates of tubes 362 and 363 and ground at 378, and in its place between the plates of the tubes 362 and 363 and the plus B battery 372 is inserted a resistor or lamps 376, as shown. With the signals from the background or white portion of the original copy at the transmitter rectified as before, a negative potential is placed on the grids of tubes 362 and 363, which negative potential prevents any flow of plate current through the tubes and allows the current from battery 372 to flow through the resistance units 376, conductor 364, lower blade of switch 365, conductor 366, the recording unit 26, milliammeter 368, and resistor 370 to ground at 378. When the light beam at the transmitter scans the dark portion of the original copy, the resultant carrier signal when rectified by tube 361 is not sufficient to block the flow of plate current of tubes 362 and 363, which plate current now flows through the resistors 376 from the battery 372.

This path through the tubes, being of relatively low resistance, diverts practically all of the current passing through resistors 376, away from the path to ground containing the recording unit 26, and the residual current through the recording unit 26 is not sufficient to cause the armature to be energized for marking purposes. Under this conditioning the switch 365 removes the resistor 367 from the circuit of unit 26 so as to preserve the correct resistance ratios of the network.

With the switch 381 thrown in the position shown in Fig. 19, the circuit is particularly adapted for reproducing stencils in which a trigger action is desired so that all blows of the percussion stylus 33 will be equal in intensity regardless of the density of all marks above a predetermined level on the original copy sheet from which the signals are transmitted. Where, however, it is desired to produce half tone work, as by using carbons and the like, the switch 381 may be moved to its other position to connect the grids of the tubes 362 and 363 to ground through the resistor 385, and thus change the large positive bias on the grids of tubes 362 and 363 to a substantially zero bias, and the circuit is then especially adapted for producing half tone work on the recorded copy.

Fig. 20 illustrates diagrammatically an electrical system for placing the recorder-transmitter unit in operation and controlling certain movements of the apparatus. A source of alternating current power supply for the system is connected through a line switch 390 to the various elements of the control system. When the switch 390 is closed, it will be seen that an energizing circuit is provided for the stylus retractile solenoid 220, this circuit comprising conductors 392 and 393, solenoid 220, conductor 394, break contact 395 and armature 396 of relay 397, and conductor 398 to the other side 400 of the power supply circuit, this arrangement automatically causing retraction of the recording stylus. When the "start" button is pushed inwardly, a circuit is completed from one side 400 of the power circuit, through the momentarily closed contacts of the start button, thence through the relay 397, normally closed contacts of the "stop" button, normally closed contacts of the limit switches 248 and 425, to the other side 392 of the power circuit. Relay 397 operates and locks up through its inner armature 401 and make contact 402 and conductor 398. Relay 394, in operating, also closes at its outer make contact 403 a circuit through armature 396, conductor 398 and the driving motor 50 for energizing the driving motor to start the machine in operation, the retractile solenoid 220 being deenergized by the open circuit at contact 395 of the relay 397, the relay 397 remaining locked up during the scanning operations.

When the split unit release lever shaft 206 (Figs. 1 and 7) is rotated in a direction to release the split nut unit hereinbefore referred to, as when scanning is completed, this causes rotation of the shaft 207 and actuates the switch 210 in a direction to close its contacts 218. Closure of the contacts 218 completes a circuit from one side of the power supply 400 through the contacts, conductor 405, retractile solenoid 220, and conductor 393 to the other side 293 of the power circuit, thus energizing solenoid 200 and causing withdrawal of the recording stylus 33.

Opening the contacts of the "stop" button, by pushing the button inwardly, opens the holding circuit for the relay 397, and release of its outer make contact 403 opens the driving motor circuit and stops the machine. In the event that the machine is not stopped by the stop button after a given piece of subject matter has been scanned, it will automatically be stopped by opening of the normally closed contacts 248 of the carriage limit switch when engaged by the stop member 249 mounted on the recording unit 26.

The recording unit may be operated by signals from a distant point, as stated hereinbefore, and when this is done, the control apparatus disclosed in Fig. 20 may, if desired, be operated by remote control signals in any desired manner, such, for example, as in the manner of the remote control apparatus disclosed in Fig. 9 of the aforesaid O'Brien et al. Patent No. 2,260,862. If desired, the transmitter may also be employed to transmit signals to the line L in Fig. 19 for the switch 355 or, if desired, both of these switches may be closed so that the transmitter transmits signals to the line L and also to the recorder unit 26.

Figs. 16 and 17 disclose a modified form of means for holding the transmitting and recording cylinders so that in certain instances it is unnecessary to adjust the position of the transmitting and recording units towards and from the axis of rotation of the drums to compensate for drums of different diameters. Referring to Fig. 16, reference numeral 450 designates generally a transmitter-recorder of the character shown in Fig. 1 or Fig. 7. To hold the drums in proper scanning position, there are provided upstanding bracket or bearing members 451 and 452 which hold the opposite ends, respectively, of the cylinder generally designated at 456, the bracket members being secured to the base 22 of the transmitter-recorder unit. The driving shaft 453 may be driven from the driving gear mechanism illustrated in detail in Fig. 1 except that the direction of rotation of the shaft 53 must be such that a friction drive roller 454 secured to and rotatable with an end of the shaft will drive the cylinder 456 in the direction indicated by the arrow on the cylinder.

The cylinder 456 has at the left hand end thereof, as viewed in Fig. 16, a peripheral grooved portion 457, preferably V-shaped as shown, with which the friction drive roller 454 engages, thereby to prevent slippage between the driving roller 454 and the driven cylinder 456. The cylinder has studs or shafts 458 projecting from the ends thereof, which shafts are rotatably supported in slotted portions 451a and 452a of the supports 451 and 452. Each of the bracket members 451 and 452 carries an assembly comprising a lever 460, the lever being pivotally mounted to its bracket member at 461, and carrying an idler roller 462 rotatably mounted on a stud 463 secured to the bracket 460. A tension spring 464 has one end thereof secured to the lever 460, and at the other end is anchored to a pin 465 secured to the bracket member, thereby to insure that the cylinder 456 will be maintained against the friction drive roller 454 at one end of the cylinder, the other end of the cylinder being held against an idler roller 455 mounted on a stud 455a secured to the bracket member 452.

The cylinder readily may be inserted in the slots 451a and 452a, by moving the levers 460 outwardly so that the projecting shaft portions 458 of the cylinder can enter the slots 451a and 452a from the top, after which they are slid in the slots until the cylinder abuts against the driving roller 454 and idler roller 455. When a cylinder is employed in which the transmitting and recording drum portions thereof are of the same diameter, it is unnecessary to adjust the transmitting and recording units towards and from the axis of rotation of the cylinder, since the transmitting and recording drums are held in the proper position with respect to the scanning elements by means of the rollers 454 and 455 bearing on the peripheral end portions of the cylinder. By means of this arrangement, the apparatus readily is adapted to receive cylinders of different diameters since the several scanning positions of the shafts 458 of the cylinders in the slots 451a and 452a are automatically determined by the diameters of the particular cylinders employed. The cylinders may be driven by means of gears secured to the driving ends of the cylinders, instead of the friction drive roller shown, but an advantage of the friction drive on the periphery of the cylinders is that the peripheral or linear scanning speed may thus be caused to remain the same, irrespective of the diameters of the cylinders employed.

Fig. 18 shows how transmitting and recording drums of different diameters, respectively, may concurrently be employed with the arrangement of Figs. 16 and 17. When the recording drum 477 is smaller than the transmitting drum 476, a ring or collar 480 having a peripheral V-shaped groove 481 is secured to the end of the recording cylinder 477 in any suitable manner, as by a set screw or by having the collar 480 integral with the recording drum. Where drums of different diameters are thus employed, it may be appreciated that one of the units, for example, the recorder, will have to be adjusted by means of the adjusting screws 178 and 180 so that the armature 33 of the recorder is in the proper spaced relation with respect to the recording blank on the drum 477. If the drums are reversed, that is, if a smaller drum is used for transmitting and a larger drum for recording, then the member 480 is applied to the shaft 458 at the transmitting end of the apparatus, the V-shaped groove 481 enabling the cylinder 475 to be reversed so that the smaller drum may be used for transmitting and the larger drum for recording, this portion 451 coacting with the driving roller 454 for rotating the cylinders at the proper speed to effect the desired scanning action.

In order to save operating time and to cause the scanning operation by the transmitter to stop approximately as soon as the subject matter on the original blank has been scanned, irrespective of the length of the blank, a switch 425, Figs. 1, 2 and 20, is provided, which switch may, if desired, be mounted on the travelling carriage of the recorder unit 26, the switch being connected, as by a flexible cord, in series with the carriage limit switch 248 in the manner diagrammatically shown in Fig. 20. Coacting with the switch 425 is an actuating unit 426 therefor which, as shown in Fig. 1, may comprise a collar or sleeve member 427 that has a relatively close fit with the guide rod 23 on which it is mounted, the unit 426 being slidable longitudinally along the guide rod and thus readily settable to different machine stopping positions corresponding to various positions of the transmitter at the time the subject matter on the transmitting blank has been completely scanned. Preferably, and as shown, the adjustable unit 426 has a spring member 429 carried thereby, which spring member resiliently engages in a spline 430 in the guide rod 23, thereby to prevent rotation of the unit about the guide rod and also to frictionally engage the guide rod so that the unit will remain in any adjusted position. Connected at 432 to the collar 427 is an extending portion 433 in the path of travel of the switch 425, the member 433 carrying an adjustable switch-actuating pin or member 434. When the transmitter has completed its desired scanning operation, the line feed movement of the carriage of the recording unit 26 will cause the switch 425 to engage the pin 434 which opens the normally closed switch contacts and thus automatically stops the driving motor 50 and the transmitting and recording operations.

The unit 426 is manually set by the operator prior to the scanning operation of any given subject matter, and in order to determine readily the setting to which the unit should be placed, there are provided corresponding calibrated scales 436 and 437, the scales preferably being secured to the base member 20. The calibrations on the scale 437 correspond to the calibrations on the scale 436, whereby the operator may place the subject matter sheet on the transmitting drum and visually discern the proper mark on scale 436 which represents the end of the subject matter on the blank to be scanned so that she can set the unit 426 to the corresponding mark on the scale 437, a pointer 438 on the unit facilitating the setting of the unit to the proper position. If desired, the carriage limit switch 248 hereinbefore referred to may be dispensed with, and the switch unit 425 caused to perform the dual function of stopping the transmitting scanning operation as soon as the subject matter has been scanned, and acting as a carriage limit switch to automatically stop the machine in the event the "stop" button is not operated.

The foregoing arrangement permits the operator to be engaged elsewhere, for example, on other machines, and insures that the machine will stop at the proper time without the operator's attendance. A further advantage lies in the fact that with subject matter blanks of different lengths (as measured longitudinally along the transmitting drum), and particularly when a sheet of relatively short length is placed on the transmitting drum, the automatic stop switch 425 insures that scanning will not proceed along the drum beyond the limits of the paper of the blanks which, if permitted, would cause an optical unbalance, as when the light beam leaves the paper and scans a portion of the drum, thus resulting in unwanted marks on the reproduced copy. With the arrangement above described, it makes little difference what the length of the blank may be on which the subject matter to be transmitted appears, and the blanks do not have to be made uniform in size and can always be placed at the same starting point on the drum, or if, due to carelessness of the operator, the blank is not placed at the proper starting point on the drum, nevertheless the scanning action will be stopped as soon as the subject matter on the blank has been completely scanned. Indicating means, such as arrows x and x' on the base 20, Fig. 1, facilitate proper placing of the blanks. It will be understood that the relative positions, and manner of mounting, of the switch unit 425 and its actuating unit 426 may be varied or interchanged, and that either of the units may be mounted on the transmitter carriage or other suitable supporting element to provide relative movement between them, and may be employed in connection with the various modifications of the apparatus of Fig. 1 such, for example, as illustrated in Fig. 7.

With regard to various elements of the electrical system for interconnecting and operating the transmitting and recording units, it is highly desirable that the voltage of the power supply for various ones of such elements be maintained within very close limits in order to give the best operating results. To provide a voltage regulator capable of maintaining a constant voltage in regard to the total power supplied to the transmitter-recorder would involve considerable expense, since a relatively large voltage regulator for such purpose would have to be employed. Various of the elements, however, such as the driving motor 50 and the relays and magnets in the control circuit shown in Fig. 20, will operate satisfactorily notwithstanding variations in the voltage of the current supplied to them, whereas with other elements, such as the photocell 350 and the amplifying, rectifying and recording units of the circuit of Fig. 19, the supply voltage should be maintained substantially constant at all times. As indicated in these two figures, the power supply circuit may be divided in such manner that only the extremely sensitive elements, such as those of Fig. 19, are supplied with power through a voltage regulator 440, a separate line switch 441 enabling this portion of the circuit to be controlled independently of the power supply for the circuit of Fig. 20.

As shown in Fig. 19, the voltage regulator 440, which may be any one of several suitable types known in the art, is connected to a power pack 442, the power pack having extending therefrom cables 443 and 444 for supplying current of the proper voltage, both alternating and direct, to the various units of Fig. 19. As is well known the power pack 442, which receives a source of alternating current supply of constant voltage from the voltage regulator 440, has the necessary transformers, rectifiers and voltage dividers to supply the various different currents and voltages to the system. The cable 443, for example, transmits direct and alternating currents of proper constant voltages to the photocell 350 and associated amplifier equipment 351, and the cable 444 transmits alternating and direct currents of proper constant voltages for energizing the various other amplifying and rectifying units in Fig. 19 and also the recording unit 26. Direct current of the proper voltage is applied to the plate circuits of the various tubes, whereas the filaments or heaters of the tubes may be energized with alternating current of the proper voltage, these sources of current being diagrammatically indicated in the figure by means of battery symbols which, it will be understood, represent the various sources of current obtainable from the power pack 442.

By means of the split circuit arrangement indicated in Figs. 19 and 20, a voltage regulator 440 which is appreciably smaller in size may be employed than would be the case if the voltage regulator supplied the current for the entire electrical system, and the cost of the desired voltage regulation is appreciably reduced. The voltage regulator is especially important in connection with the operation of the recording unit of the character disclosed, since when making stencils or printing plates from which copies may be made, the system provides a "trigger" action for the unit 26, thereby to prevent marking of the recorded copy unless a signal of given density is transmitted and to prevent current in excess of a predetermined amount from being applied to the recording unit, and the percussion stylus 33 will not be actuated falsely due to unwanted marks below a predetermined signal level on the original subject matter blank and, moreover, will exert substantially the same degree of striking power on the stencils or printing plates irrespective of the density of the marks on the original subjects matter blank so long as such marks are above a predetermined level. Inasmuch as the subject matter transmitted and the stencil or printing plate reproduced on the transmitter-recorder unit may be secured on a common drum or cylinder or on drums or cylinders mechanically interconnected with each other, no synchronization problem is presented and a faithful copy in exact register will be produced on the stencil sheet or printing plate as scanning proceeds. Prior to a scanning operation the photoelectric pickup device 350 may be balanced on a selected portion of the original blank, as on a white portion thereof, by adjusting the gain control 352 on the pickup carriage, correct balance being indicated by a predetermined deflection of the milliammeter 368. Also, proper balance may be effected by directing the beam which is projected into the photocell 350, upon the lightest portion of the original which is to be produced, for example, a pencil mark, and adjusting amplifier control so that the stylus just marks. With this setting anything lighter in shade than the portion of the original selected for the balancing operation will not operate the stylus 33 of the recorder.

In general, when preparing stencils or printing plates from which copies may be made, it is not desirable to transmit signals directly proportional to the shading of the picture or other original subject matter transmitted, but rather to transmit a signal of the same intensity for the lightest mark as for the heaviest mark, this equalization of signals being desirable to avoid a tendency for dropouts in the case of light or faint signals and a tendency for the recording stylus to tear or mutilate the recording medium in the case of a heavy or strong signal. This equalization is obtainable in the system of Fig. 19 by placing on the grids of the output tubes 362 and 363 a heavy positive bias, the rectified signal from the photocell being poled in such manner than an incoming signal will overcome by a large margin this positive bias, and cause a resultant large negative bias to be placed on the grids of these output tubes, thus reducing the plate current of these tubes to a minimum. When the light from the exciter lamp in the transmitter is focused, for example, on the white portion of the original subject matter, the reflected light causes no current to flow through the recording unit 26 in the plate circuit of the output tubes, whereas the reflected light from the black mark above a predetermined level on the original copy causes a decrease in the signal to such an extent that the rectified voltage will not overcome the positive grid bias on the output tubes and will allow the plate current to reach a maximum. The current limiting resistor 370, which for ordinary usage may have a resistance of the order of five thousand ohms, may be of the replaceable type and can be changed from time to time if it is deemed necessary. The equalization referred to above allows a change in plate current from approximately zero level to maximum with a very slight decrease in the amplified signal.

While the invention has been described and explained in detail in connection with the various illustrative embodiments thereof, it is to be understood that the invention may be embodied in other forms and that the invention is not limited except as indicated by the terms and scope of the appended claims.

What is claimed is:

1. In apparatus for facsimile telegraphy, the combination of means for releasably engaging and axially supporting interchangeable message cylinders having substantially different diameters respectively for holding blanks of different sizes during scanning operations, driving means operable at a predetermined constant speed for rotating the cylinder at the time engaged by said supporting means, a scanning unit having means for scanning the blank on said cylinder, said scanning unit being molded on a carriage, means for progressively moving said carriage longitudinally along said cylinder during rotation thereof to provide proper line feed of the scanning unit, and means for insuring that the scanning means of the unit will be properly positioned with respect to the blanks notwithstanding that said cylinders of different diameters are employed, said last named means comprising means on said apparatus for enabling relative adjustment of said scanning unit and the cylinder to be scanned, to any one of different predetermined positions with respect to the axis of rotation of said cylinder, corresponding to the diameter of the particular cylinder to be scanned.

2. In apparatus for facsimile telegraphy, the combination of means for releasably engaging and axially supporting interchangeable message cylinders having substantially different diameters respectively for holding blanks of different sizes during scanning operations, driving means operable at a predetermined constant speed for rotating the cylinder at the time engaged by said supporting means, a scanning unit having means for scanning the blank on said cylinder, said scanning unit being mounted on a carriage, means for progressively moving said carriage longitudinally along said cylinder during rotation thereof to provide proper line feed of the scanning unit, means for insuring that the scanning means of the unit will be properly positioned with respect to the blanks notwithstanding that said cylinders of different diameters are employed, said last named means comprising coacting means on said apparatus for enabling relative adjustment of the scanning unit and the cylinder to be scanned, to any one of different predetermined positions with respect to the axis of rotation of said cylinder, corresponding to the diameter of the particular cylinder to be scanned, and means automatically for causing said driving means to rotate the respective cylinders in such manner that the peripheral speed, and hence the linear scanning speed, of the cylinders is substantially the same for said cylinders of different diameters.

3. In apparatus for facsimile telegraphy, the combination of rotatable clutch means for releasably engaging and axially supporting in driving relation interchangeable message cylinders having substantially different diameters respectively for holding blanks of different sizes during scanning operations, driving means operable at a predetermined constant speed for rotating said clutch means and causing rotation of the cylinder when engaged by the clutch means, a scanning unit having means for scanning the blank on said cylinder, said scanning unit being mounted on a carriage, means for progressively moving said carriage longitudinally along said cylinder during rotation thereof to provide proper line feed of the scanning unit, and means for enabling the scanning means of the unit to be positioned properly with respect to the blanks notwithstanding that said cylinders of different diameters are employed, said last named means comprising a manually operable screw-threaded rod and a screw-threaded member engageable thereby for enabling the scanning unit to be moved relative to the carriage to any one of different predetermined positions, towards and from the axis of rotation of said cylinder, corresponding to the diameter of the particular cylinder to be scanned.

4. In apparatus for facsimile telegraphy, the combination of means for releasably engaging and axially supporting interchangeable message cylinders having substantially different diameters respectively for holding blanks of different sizes during scanning operations, driving means operable at a predetermined constant speed for rotating the cylinder at the time engaged by said supporting means, a scanning device for scanning the blank on said cylinder, a scanning carriage for the scanning device, means including a rotatable line feed shaft for moving said carriage longitudinally along said cylinder during rotation thereof to provide proper line feed of the scanning device, and means for enabling the scanning device to be positioned properly with respect to the blanks notwithstanding that said cylinders of different diameters are employed, said last named means comprising structure including a guideway on the scanning carriage for supporting and guiding the said scanning device in a manner to enable the scanning device to be slid towards and from the axis of rotation of said cylinder, coacting adjusting means on said carriage and scanning device for sliding the scanning device to any one of different operative positions, coacting members on said carriage and scanning device for indicating when the scanning device is set to a position corresponding to the diameter of the particular cylinder next to be scanned, one of said coacting indicating members having thereon a plurality of indicia respectively corresponding to said cylinders of different diameters, and a vernier device operatively associated with said adjusting means for enabling a micrometer adjustment of the scanning device to be effected after the device has been set to one of the indicia corresponding to the particular cylinder to be scanned.

5. A facsimile transmitter and recorder unit comprising means for releasably engaging and axially supporting in scanning position interchangeable transmitting and recording message cylinders having substantially different diameters respectively for holding transmitting and recording blanks of different sizes during scanning operations, driving means operable at a predetermined speed for rotating the transmitting and recording cylinders at the time engaged by said supporting means, transmitter and recorder scanning units having means respectively for scanning the blanks on said transmitting and recording cylinders, said scanning units each being mounted on a carriage, means for progressively moving said carriages longitudinally along said cylinders during rotation thereof to provide line feed of the scanning units, and means for insuring that the scanning units will be positioned properly with respect to the transmitting and recording blanks notwithstanding that cylinders of said different diameters are employed, said last named means comprising means on said unit for enabling relative adjustment of said transmitter and recorder scanning units and the cylinders to be scanned, to any one of different predetermined positions with respect to the axes of rotation of said cylinders, in accordance with the diameters of the particular cylinders to be scanned.

6. In apparatus for facsimile telegraphy, a scanning device, means including a rotatable clutch means for releasably engaging and axially supporting in scanning position interchangeable cylinders of different diameters respectively for holding blanks of different sizes to be scanned by said scanning device during rotation of the cylinders, driving means for causing said clutch means to rotate said cylinders during scanning operations, and means for causing the blanks on said cylinders of different diameters to have approximately the same linear scanning speed, said last named means comprising driving members having different driving ratios interposed between said driving means and said clutch means and shift mechanism for changing the driving ratio of the driving members in such manner that the peripheral speed of the cylinders automatically is maintained approximately the same for said cylinders of different diameters.

7. In apparatus for facsimile telegraphy, a scanning device, means including rotatable clutch means for releasably engaging and axially supporting in scanning position interchangeable cylinders of different diameters respectively for holding blanks of different sizes to be scanned by said scanning device during rotation of the cylinders, driving means for causing said clutch means to rotate said cylinders during scanning operations, means for causing the blanks on said cylinders of different diameters to have approximately the same linear scanning speed, said last named means comprising driving members having different driving ratios interposed between said driving means and said clutch means and shift mechanism for changing the driving ratio of the driving members in such manner that the peripheral speed of the cylinders automatically is maintained approximately the same for said cylinders of different diameters, means for progressively moving said scanning device longitudinally along the cylinders during rotation thereof to provide line feed of the scanning unit, and means for preventing distortion of the subject matter on said blanks when cylinders of different diameters are employed, said last named means comprising means for driving said line feed means at different speeds respectively corresponding to the peripheral speeds of said cylinders of different diameters as determined by said shift mechanism.

8. In apparatus for facsimile telegraphy, a scanning device, means including rotatable clutch means for rotatably engaging and axially supporting interchangeable cylinders for holding blanks of different sizes respectively to be scanned by said scanning device during rotation of the cylinders, driving means operable at a predetermined constant speed for causing said clutch means to rotate the cylinder at the time engaged by the clutch means, intermediate driving members having different driving ratios operatively disposed between said driving means and said clutch means, drum speed shift mechanism for changing at will the driving ratio of said intermediate driving members to provide different predetermined speeds of rotation of the cylinders and determine the linear scanning speeds of the blanks carried by the cylinders, means comprising a rotatable line feed shaft for progressively moving said scanning device longitudinally along the cylinder at the time being scanned, means including said intermediate driving members for rotating said line feed shaft, other line feed shaft driving members having different driving ratios operatively disposed between said intermediate driving members and said line feed shaft, and line feed shift mechanism for changing at will the driving ratio of said other driving members to provide different predetermined speeds of rotation of the line feed shaft and determine the number of scanning lines per unit of length during scanning operations.

9. A facsimile transmitter and recorder unit comprising a transmitter scanning device and a recorder scanning device, means for releasably engaging and axially supporting in scanning position interchangeable transmitting and recording message cylinders of different diameters respectively for holding transmitting and recording blanks during scanning operations in such manner that the subject matter on a transmitting blank when reproduced on a recording blank may be either enlarged or reduced depending on whether the recording cylinder is larger or smaller in diameter than the transmitting cylinder, driving means operable at a predetermined speed for rotating the transmitting and recording cylinders in synchronism during scanning operations, means for advancing said transmitter and recorder scanning devices longitudinally along said transmitting and recording cylinders respectively to provide line feed of the scanning devices, and means for preventing distortion of the subject matter reproduced on the recording blank when transmitting and recording cylinders of different diameters respectively are employed, comprising means for causing the transmitter and recorder line feed advancing means respectively to operate at different predetermined relative speeds in accordance with the different diameters of the transmitting and recording cylinders.

10. A facsimile transmitter and recorder unit comprising a transmitter scanning device and a recorder scanning device, means for releasably engaging and axially supporting in scanning position interchangeable transmitting and recording message cylinders of different diameters respectively for holding transmitting and recording blanks during scanning operations in such manner that the subject matter on a transmitting blank when reproduced on a recording blank may be either enlarged or reduced depending on whether the recording cylinder is larger or smaller in diameter than the transmitting cylinder, driving means operable at a predetermined speed for rotating the transmitting and recording cylinders in synchronism during scanning operations, means including rotatable line feed shafts respectively for advancing said transmitter and recorder scanning devices longitudinally along said transmitting and recording cylinders, and means for preventing distortion of the subject matter reproduced on the recording blank when transmitting and recording cylinders of different diameters respectively are employed, comprising driving members having different driving ratios operatively connected with said line feed shafts, and line feed shift mechanism for changing at will the driving ratio of said driving members to provide different predetermined relative speeds of rotation of said line feed shafts in accordance with the different diameters of the transmitting and recording cylinders.

11. In apparatus for facsimile telegraphy, the combination of a scanning device, means for releasably engaging and axially supporting interchangeable message cylinder structures for holding blanks to be scanned by said scanning device, said means comprising rotatable clutch members respectively engageable with opposite ends of the cylinder structure to be scanned, driving means for rotating one of said clutch members to cause rotation of the cylinder structure during scanning operations, means for supporting the other clutch member so as to be freely rotatable with the cylinder structure and also axially movable towards and from the end of the cylinder structure, means for resiliently urging said other clutch member into engagement with an end of the cylinder structure, and manually operable mechanism for actuating at will the clutch member towards and from the cylinder structure to enable ready insertion and removal of the cylinder structure, said mechanism comprising relatively fixed and movable coacting cam members, the movable cam member being operatively secured to said other clutch member and rotatable relative to the fixed cam member for causing movement of the clutch member towards and from the cylinder structure.

12. A copy holding drum for use in facsimile transmitting and recording apparatus having members for releasably engaging and axially supporting at least two drums simultaneously in alignment with each other in scanning position, said drum having means at one end thereof adapted to engage one of said supporting members, the other end of the drum having means for engaging in scanning position the adjacent end of another drum to be held in axial alignment with the first named drum, said means comprising clutch structure formed on said other end of the drum for supporting and engaging in driving relation therewith the adjacent end of said other drum so that the inner adjacent ends of the drums mutually support each other and hold the drums in scanning position when supported at their outer ends by said supporting members.

13. In apparatus for facsimile telegraphy, the combination of means for releasably engaging and axially supporting interchangeable message cylinders for holding blanks during scanning operations, driving means for rotating the cylinder at the time engaged by said supporting means, a scanning unit having means for scanning the blank on said cylinder, said scanning unit being mounted on a carriage, means comprising a line feed driving member and a driven member engageable therewith for progressively moving said carriage longitudinally along said cylinder during rotation thereof to provide line feed of the scanning unit, means operable at will for disengaging said line feed driving member and said driven member to stop the line feed movement of the scanning unit, and means responsive to said disengagement of the line feed members for automatically causing the scanning means of the scanning unit to be retracted from its scanning position with respect to the cylinder and the blank thereon.

14. In apparatus for facsimile telegraphy, the combination of members for releasably engaging and axially supporting interchangeable message cylinders at the outer ends thereof for holding blanks during scanning operations, means comprising a plurality of fixed saddle structures having portions thereof positioned adjacent to said supporting means and beneath the axis of rotation of a message cylinder when in scanning position, and adapted to receive and hold the cylinder prior to its engagement with or subsequent to its release from said supporting means, said saddle structures also having other portions thereof adapted to receive and hold the outer ends of the cylinder when positioned in front of said apparatus either prior or subsequent to a scanning operation, thereby to provide a rest for the cylinders to facilitate application thereto and removal therefrom of said blanks.

15. In the art of producing a master copy of pictures, drawings, writings and other subject matter appearing on an original subject matter blank by recording the subject matter thereof in facsimile on the master copy when mounted on a recording platen having a scanning recording device including a recording stylus associated therewith, the method of making a master copy from which numerous copies may be produced directly by ink printing processes, which comprises placing on said platen a metallic planograph printing sheet of a character such that it may be sensitized to ink with respect to the image areas thereof, and desensitized with respect to the non-image areas thereof, providing a carrier for a greasy ink-retaining image-forming substance, deriving facsimile signals by scanning the subject matter on the original blank, and causing said signals to operate said scanning recording device and stylus in a manner to cause the stylus intermittently to impinge on said carrier to effect transfer of said substance from said carrier to said surface of the printing sheet in selectable areas thereof to produce a facsimile image composed of said ink-retaining substance in accordance with the subject matter on said original blank.

16. In the art of producing a master copy of pictures, drawings, writings and other subject matter appearing on an original subject matter blank by recording the subject matter thereof in facsimile on the master copy when mounted on a recording cylinder having a scanning recording device including a recording percussion stylus in operative relation therewith, the method of making a master copy from which numerous copies may be produced directly by ink printing processes, which comprises curving a substantially flat metallic planographic printing sheet of a character such that it may be sensitized to ink with respect to the image areas thereof, and desensitized with respect to the non-image areas thereof, to impart to said sheet a smooth rounded contour free from creases and conforming substantially to the contour of the recording cylinder, securing said curved sheet on a recording cylinder, interposing between the stylus and the adjacent surface of said printing sheet a carrier for a greasy ink-retaining image-forming substance, deriving facsimile signals by scanning the subject matter on the original blank, and causing said signals to operate said scanning recording device and stylus in a manner to cause the stylus intermittently to impinge on said carrier to effect transfer of said substance to said surface of the printing sheet in selectable areas thereof to produce a facsimile image composed of said ink-retaining substance in accordance with the subject matter on said original blank.

17. A device for preforming a metallic planograph printing plate in such manner that the plate is curved generally in the form of a cylinder and conforming substantially to the scanning cylinder of a facsimile recording machine, said device comprising a resilient pad, a forming roller rotatably mounted above said pad for receiving a substantially flat printing plate between said roller and the surface of said pad, means for securing said roller in a position such that it is embedded a substantial distance in the surface of said pad so as to exert a predetermined pressure on the printing plate when between the roller and pad, means for rotating said roller in a direction to feed the printing plate through said device, the pressure exerted by said forming roller on the surface of said printing plate being such as to give a predetermined degree of curvature to the printing plate as it passes through the device, said device also having means for securing said roller in another position to relieve the pressure exerted by the forming roller on the surface of the printing plate to an extent such that when a curved printing plate is passed through the device, with the curved portion of the plate upwardly, just sufficient pressure will be exerted by the roller and pad to remove the curvature in the printing plate and cause the same to have a substantially flat configuration after it passes through said device.

18. In combination in a facsimile machine, a scanner, a facsimile message cylinder, a device for releasably securing a facsimile recording blank of paper, metal, or the like snugly on the surface of the facsimile message cylinder in proper phase position with respect to the cylinder, said device comprising a spring wire helix in the form of an annulus forming the core of the securing device, and short lengths of tubing of resilient material surrounding said core to prevent contact of the spring wire helix with the blank on the cylinder being scanned.

19. In a system for facsimile transmission and reception, a photo-electric pickup device for generating signals corresponding to the subject matter scanned by said pickup device, a first amplifier means for amplifying the signals produced by the photo-electric pickup device, a receiving circuit comprising a second amplifier means for receiving and amplifying the signals received from the transmitting device, a recording device responsive to said signals for recording in facsimile the subject matter scanned by the transmitting device, and means comprising thermionic tube structure having grid and plate circuits for applying the received signals to the recording device, means in the receiving circuit for rectifying the received signals, means for applying the rectified signals to the grid circuit of said thermionic tube structure and circuit connections including switching means for causing the plate circuit of said thermionic tube structure to have either a series connection or a parallel connection with respect to asid recording device such that in the series-connection position of the switching means the signals will actuate the recording device to produce a positive facsimile copy, and in the parallel-connection position of the switching means the signals will actuate the recording device to produce a negative facsimile copy.

20. In apparatus for facsimile telegraphy, the combination of means for releasably engaging and axially supporting interchangeable message cylinders having substantially different diameters respectively for holding blanks of different sizes during scanning operations, driving means operable at a predetermined constant speed for rotating the cylinder at the time engaged by said supporting means, a scanning unit having means for scanning the blank on said cylinder, said scanning unit being mounted on a carriage, means for progressively moving said carriage longitudinally along said cylinder during rotation thereof to provide proper line feed of the scanning unit, and means for insuring that the scanning means of the unit will be properly positioned with respect to the blanks notwithstanding that said cylinders of different diameters are employed, said last named means comprising means on said apparatus embodied in said supporting means for axially and rotatably supporting in different operating positions respectively the cylinders of different diameters for enabling relative adjustment of said scanning unit and the cylinder to be scanned, to any one of different predetermined positions with respect to the axis of rotation of said cylinder, corresponding to the diameter of the particular cylinder to be scanned.

21. In apparatus for facsimile telegraphy, the combination of means for releasably engaging and axially supporting interchangeable message cylinders having substantially different diameters respectively for holding blanks of different sizes during scanning operations, driving means operable at a predetermined constant speed for rotating the cylinder at the time engaged by said supporting means, a scanning unit having means for scanning the blank on said cylinder, said scanning unit being mounted on a carriage, means for progressively moving said carriage longitudinally along said cylinder during rotation thereof to provide proper line feed of the scanning unit, and means for insuring that the scanning means of the unit will be properly positioned with respect to the blanks notwithstanding that said cylinders of different diameters are employed, said last named means comprising means on said apparatus including extending bearing members having apertured portions for receiving the ends of said cylinders and axially and rotatably supporting in different operating positions respectively the cylinders of different diameters for enabling relative adjustment of said scanning unit and the cylinder to be scanned, to any one of different predetermined positions with respect to the axis of rotation of said cylinder, corresponding to the diameter of the particular cylinder to be scanned.

22. In apparatus for facsimile telegraphy, the combination of means for releasably engaging and axially supporting interchangeable message cylinders having substantially different diameters respectively for holding blanks of different sizes during scanning operations, driving means operable at a predetermined constant speed for rotating the cylinder at the time engaged by said supporting means, a scanning unit having means for scanning the blank on said cylinder, said scanning unit being mounted on a carriage, means for progressively moving said carriage longitudinally along said cylinder during rotation thereof to provide proper line feed of the scanning unit, means for insuring that the scanning means of the unit will be properly positioned with respect to the blanks notwithstanding that said cylinders of different diameters are employed, said last named means comprising coacting means on said apparatus for enabling relative adjustment of the scanning unit and the cylinder to be scanned, to any one of different predetermined positions with respect to the axis of rotation of said cylinder, corresponding to the diameter of the particular cylinder to be scanned, and means for automatically causing said driving means to rotate the respective cylinders in such manner that the peripheral speed, and hence the linear scanning speed, of the cylinders is substantially the same for said cylinders of different diameters, said means comprising a driving member which engages and drives a peripheral portion of the cylinder at the time being scanned and rotates the cylinder by the movement thus imparted to said peripheral portion.

23. In apparatus for facsimile telegraphy, the combination of means for releasably engaging and axially supporting interchangeable message cylinders having substantially different diameters respectively for holding blanks of different sizes during scanning operations, driving means operable at a predetermined constant speed for rotating the cylinder at the time engaged by said supporting means, a scanning unit having means for scanning the blank on said cylinder, said scanning unit being mounted on a carriage, means for progressively moving said carriage longitudinally along said cylinder during rotation thereof to provide proper line feed of the scanning unit, means for insuring that the scanning means of the unit will be properly positioned with respect to the blanks notwithstanding that said cylinders of different diameters are employed, said last named means comprising coacting means on said apparatus for enabling relative adjustment of the scanning unit and the cylinder to be scanned, to any one of different predetermined positions with respect to the axis of rotation of said cylinder, corresponding to the diameter of the particular cylinder to be scanned, means for automatically causing said driving means to rotate the respective cylinders in such manner that the peripheral speed, and hence the linear scanning speed, of the cylinders is substantially the same for said cylinders of different diameters, said means comprising a driving member which engages and drives a peripheral portion of the cylinder at the time being scanned and rotates the cylinder by the movement thus imparted to said peripheral portion, and means for resiliently urging said driving member and peripheral portion into driving engagement with each other.

FERNAND E. D'HUMY.
RALEIGH J. WISE.
ROBERT D. PARROTT.
GARVICE H. RIDINGS.
FREDERIC L. O'BRIEN.